United States Patent
Ma et al.

(10) Patent No.: US 12,543,113 B2
(45) Date of Patent: Feb. 3, 2026

(54) METHOD FOR A RELAXED UE PROCESSING TIME

(71) Applicant: ZTE CORPORATION, Guangdong (CN)

(72) Inventors: Xiaoying Ma, Shenzhen (CN); Mengzhu Chen, Shenzhen (CN); Jun Xu, Shenzhen (CN); Qiujin Guo, Shenzhen (CN); Focai Peng, Shenzhen (CN); Jian Kang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 399 days.

(21) Appl. No.: 18/104,709

(22) Filed: Feb. 1, 2023

(65) Prior Publication Data
US 2023/0319708 A1    Oct. 5, 2023

Related U.S. Application Data

(63) Continuation of application No. PCT/CN2020/109296, filed on Aug. 14, 2020.

(51) Int. Cl.
*H04W 52/02* (2009.01)
*H04W 8/24* (2009.01)

(52) U.S. Cl.
CPC ......... *H04W 52/0209* (2013.01); *H04W 8/24* (2013.01)

(58) Field of Classification Search
CPC ... H04W 52/0209; H04W 8/24; H04W 72/51; H04W 24/02; H04W 72/0446; Y02D 30/70
See application file for complete search history.

(56) References Cited

U.S. PATENT DOCUMENTS

| | | | |
|---|---|---|---|
| 10,477,016 B2* | 11/2019 | Wohlert | H04W 4/16 |
| 12,028,868 B2* | 7/2024 | Lin | H04W 52/0235 |
| 2017/0046447 A1* | 2/2017 | Peng | G06F 16/285 |
| 2017/0295005 A1* | 10/2017 | Lee | H04W 36/0055 |
| 2017/0367032 A1* | 12/2017 | Luo | H04W 72/0453 |
| 2019/0007962 A1* | 1/2019 | Arshad | H04W 72/0446 |
| 2019/0254060 A1 | 8/2019 | Li | |
| 2019/0372721 A1* | 12/2019 | Lee | H04L 1/1864 |
| 2020/0037245 A1 | 1/2020 | Lu et al. | |

(Continued)

FOREIGN PATENT DOCUMENTS

| | | |
|---|---|---|
| CN | 108496386 A | 9/2018 |
| CN | 110753341 A | 2/2020 |
| WO | WO-2019/096098 A1 | 5/2019 |

OTHER PUBLICATIONS

First Office Action for CN Appl. No. 202080103931.8, dated Aug. 14, 2024 (with English translation, 37 pages).

(Continued)

*Primary Examiner* — Dominic E Rego
(74) *Attorney, Agent, or Firm* — Foley & Lardner LLP

(57) ABSTRACT

A wireless communication method for use in a wireless terminal is disclosed. The wireless communication method comprises transmitting, to a wireless network node, information associated with a user equipment (UE) capability, determining a UE processing time based on the information and a first condition, and performing at least one transmission based on the UE processing time, wherein the UE processing time comprises one of a first UE processing time, a second UE processing time or a third UE processing time.

20 Claims, 3 Drawing Sheets

(56) References Cited

U.S. PATENT DOCUMENTS

| | | | |
|---|---|---|---|
| 2020/0305147 A1* | 9/2020 | Lee | H04L 1/1664 |
| 2020/0336887 A1* | 10/2020 | Ou | H04W 8/24 |
| 2020/0374042 A1* | 11/2020 | Feng | H04W 72/20 |
| 2020/0374157 A1* | 11/2020 | Chen | H04W 72/23 |
| 2020/0374911 A1* | 11/2020 | Lee | H04L 5/0007 |
| 2021/0022142 A1* | 1/2021 | Wu | H04L 1/1896 |
| 2021/0037484 A1* | 2/2021 | Zhou | H04W 52/386 |
| 2021/0045105 A1* | 2/2021 | Yoon | H04W 72/21 |
| 2021/0056707 A1* | 2/2021 | Fukuba | G06V 10/25 |
| 2021/0099979 A1* | 4/2021 | Takeda | H04W 72/23 |
| 2021/0105217 A1* | 4/2021 | Saber | H04W 72/51 |
| 2021/0136795 A1* | 5/2021 | Saber | H04W 72/02 |
| 2021/0153177 A1* | 5/2021 | Hosseini | H04W 72/23 |
| 2021/0266938 A1* | 8/2021 | Khoshnevisan | H04W 72/23 |
| 2021/0329556 A1* | 10/2021 | Kim | H04W 52/0229 |
| 2021/0385802 A1* | 12/2021 | Bae | H04W 72/23 |
| 2022/0030601 A1* | 1/2022 | Wang | H04W 72/23 |
| 2022/0200735 A1* | 6/2022 | Yang | H04W 72/0446 |
| 2023/0171767 A1* | 6/2023 | Saber | H04W 36/185 370/329 |
| 2023/0319543 A1* | 10/2023 | Frenne | H04W 76/27 370/329 |
| 2025/0126558 A1* | 4/2025 | Ma | H04W 28/02 |

OTHER PUBLICATIONS

Ericsson, "Potential UE complexity reduction features for Redcap" 3GPP TSG-RAN WG1 Meeting #101-e, R1-2003289, Jun. 5, 2020, e-Meeting (35 pages).
Intel Corporation, "On complexity reduction for RedCap UEs" 3GPP TSG RAN WG1 Meeting #102-E, R1-2005880, Aug. 28, 2020, e-Meeting (14 pages).
International Search Report and Written Opinion for PCT Appl. No. PCT/CN2020/109296, mailed May 12, 2021 (7 pages).
Samsung, "UE complexity reduction" 3GPP TSG RAN WG1 #101, R1-2003910, Jun. 5, 2020, e-Meeting (7 pages).

\* cited by examiner

METHOD FOR A RELAXED UE PROCESSING TIME

This application is a continuation of PCT/CN2020/109296, filed Aug. 14, 2020, the content of which is incorporated herein by reference in its entirety.

TECHNICAL FIELD

This document is directed generally to wireless communications.

BACKGROUND

With the development of wireless communication technology, the transmission rate, delay, throughput, reliability and other performance indexes of wireless communication systems have been significantly improved by using a high frequency band, a large bandwidth, multi-antenna and/or other technologies. On the other hand, in order to achieve high-performance wireless transmissions, terminals need to carry out more complex processing to meet performance requirements, such as monitoring larger control channel bandwidth, encoding and decoding processing for more complex control information and data information, etc. The power consumption of terminals affects user experience. Therefore, the power saving of terminals is a problem that wireless communication systems are to solve.

SUMMARY

This document relates to methods, systems, and devices for performing a relaxed UE processing time.

The present disclosure relates to a wireless communication method for use in a wireless terminal. The wireless communication method comprises:
    transmitting, to a wireless network node, information associated with a user equipment (UE) capability,
    determining a UE processing time based on the information and a first condition, and
    performing at least one transmission based on the UE processing time,
    wherein the UE processing time comprises one of a first UE processing time, a second UE processing time or a third UE processing time.

Various embodiments may preferably implement the following features:

Preferably in some implementations, the second UE processing time is greater than at least one of the first UE processing time or the third UE processing time.

Preferably in some implementations, the second UE processing time is greater than the first UE processing time and smaller than 10 times of the first UE processing time.

Preferably in some implementations, the second UE processing time is greater than or equal to 2 times of the third UE processing time and is smaller than 20 times of the third UE processing time.

Preferably in some implementations, each UE processing time comprises at least one of a physical downlink shared channel (PDSCH) processing time, a physical uplink shared channel (PUSCH) preparation procedure time, a medium access control control element (MAC CE) processing time, a channel state information (CSI) computation time, or a physical downlink control channel (PDCCH) decoding time.

Preferably in some implementations, the PDSCH processing time corresponding to the second UE processing time is associated with at least one of a PDSCH dedicated demodulation reference signal (DMRS) a subcarrier spacing (SCS), a PDSCH mapping type, a type of frequency range (FR), a high layer signaling, the PDSCH processing time corresponding to the first UE processing time, a user equipment, UE, capability of the wireless terminal, a UE type of the wireless terminal, a UE category of the wireless terminal, or a scaling factor.

Preferably in some implementations, the PDSCH processing time has a positive relationship with the SCS.

Preferably in some implementations, the PDSCH processing time corresponding to a first SCS is greater or equal to 1.1 times of the PDSCH processing time corresponding to a second SCS and is smaller than 10 times of the PDSCH process time corresponding to the second SCS, and the first SCS is greater than the second SCS.

Preferably in some implementations, the UE processing time comprises the PDSCH processing time of the second UE processing time, a first time period associated with the second UE processing time is greater than the first time period associated with the first UE processing time, and the first time period is associated with the UE processing time and comprises at least one of: the minimum time between the last symbol of a PDSCH corresponding to a system information radio network temporary identifier (SI-RNTI) and a starting symbol of a re-transmission of a PDSCH before the PDSCH, a time duration from the last symbol of a PDCCH to the first symbol of corresponding hybrid automatic repeat request acknowledge (HARQ-ACK) information, a time duration between the last symbol of second downlink control information (DCI) which indicate a second resource of a PUCCH and the first symbol of a PUCCH resource which is indicated by first DCI and the wireless terminal multiplexes HARQ-ACK information corresponding to the second DCI format in, or a time duration in a physical random access channel (PRACH) procedure.

Preferably in some implementations, the PUSCH preparation procedure time corresponding to the second UE processing time is associated with at least one of a SCS, the PUSCH preparation procedure time corresponding to the first UE processing time, the UE capability of the wireless terminal, a UE type of the wireless terminal, a UE category of the wireless terminal, a high layer signaling, or a type of FR.

Preferably in some implementations, the PUSCH processing time corresponding to a first SCS is greater or equal to 1.1 times of the PUSCH processing time corresponding to a second SCS and is smaller than 10 times of the PUSCH processing time corresponding to the second SCS, and wherein the first SCS is greater than the second SCS.

Preferably in some implementations, the UE processing time comprises the PUSCH processing time of the second UE processing time, a second time period associated with the second UE processing time is greater than the second time period associated with the first UE processing time, and the second time period is associated with the UE processing time and comprises at least one of a time period between a PDCCH and a corresponding PRACH, or a time period between a slot in which a timing advance command is received and an uplink transmission applying the timing advance command.

Preferably in some implementations, the MAC CE processing time corresponding to the second UE processing time is associated with at least one of the number of slots per subframe, the MAC CE processing time corresponding to the first UE processing, a predefined value, a UE capability or a high layer signaling.

Preferably in some implementations, the UE processing time comprises the MAC CE processing time of the second UE processing time, a third time period associated with the second UE processing time is greater than the third time period associated with the first UE processing time, and the third time period is associated with the UE processing time and is between a PUCCH with HARQ-ACK information corresponding to a PDSCH and a slot in which an indication carried by the PDSCH is applied.

Preferably in some implementations, the indication comprises at least one of: an activation command indicating a mapping between transmission configuration states and codepoints of a field in DCI, the indication comprises an activation command indicating a semi-persistent reporting setting, an activation command for a secondary cell, or the indication comprises a deactivation command indicating at least one of a semi-persistent CSI reference signal resource set deactivation or a CSI interference measurement resource set deactivation.

Preferably in some implementations, the CSI computation time corresponding to the second UE processing time is associated with at least one of a report quantity of CSI, the UE capability of the wireless terminal, a high layer signaling, an index of report of CSI, a SCS, a frequency granularity of CSI, or the number of simultaneous CSI calculations supported by the wireless terminal.

Preferably in some implementations, the PDCCH decoding time corresponding to the second UE processing time is associated with a SCS, a control resource set (CORSET), a search space set, a DCI format, a radio network temporary identifier (RNTI), the UE capability of the wireless terminal, a UE type of the wireless terminal, a predefined value, a high layer signaling or a UE category of the wireless terminal.

Preferably in some implementations, the UE processing time comprises the PDCCH decoding time processing time of the second UE processing time, a fourth time period associated with the second UE processing time is greater than the fourth time period associated with the first UE processing time, and the fourth time period associated with the UE processing time comprises at least one of a bandwidth part (BWP), switch delay time, a beam switch time, a beam report time, a slot format indication, SFI, apply time, a channel occupancy (CO), apply time, a time duration for quasi co-location (QCL), a search space switch apply time, a cross-slot scheduling application delay time, the minimum time gap, a power saving offset.

Preferably in some implementations, the first condition is associated with at least one of a high layer signaling, the UE capability, a UE type, a UE category, DCI, a radio network temporary identifier, a modulation order, a BWP, a transport block size, a CORESET, a search space set, or at least one of a sequence, a resource or a format of a random access preamble.

Preferably in some implementations, the UE capability indicates supporting the second UE processing time, the higher layer signaling indicates enabling the second UE processing time and the UE processing time comprises the second UE processing time.

Preferably in some implementations, the UE capability indicates supporting the third UE processing time, the higher layer signaling indicates enabling the third UE processing time and the UE processing time comprises the third UE processing time.

Preferably in some implementations, the UE capability indicates not supporting the third UE processing time, the higher layer signaling indicates not enabling the third UE processing time and the UE processing time comprises the first UE processing time.

Preferably in some implementations, the first condition is associated with at least one of the DCI scheduling a PDSCH or the modulation order, and the DCI indicates the modulation order is greater than a threshold and the UE processing time comprises the first UE processing time or the third UE processing time, or the DCI indicates the modulation order is smaller than or equal to the threshold and the UE processing time comprises the second UE processing time.

Preferably in some implementations, a bandwidth of the BWP is greater than a threshold and the UE processing time comprises the first UE processing time or the third UE processing time, or the bandwidth of the BWP is smaller or equal to the threshold and the UE processing time comprises the second UE processing time.

Preferably in some implementations, the first condition of the wireless terminal is associated with a pre-defined UE category and the UE processing refers to the second UE processing time.

Preferably in some implementations, the pre-defined UE category comprises a reduced-capability UE.

Preferably in some implementations, the predefined UE category is associated with a bandwidth supported by the wireless terminal, the maximum multiple-input-multiple-output layer, the maximum rank, the number of ports, the maximum number of HARQ processes, the maximum modulation order, the maximum code rate, the maximum number of bits received within a period, the maximum number of bits of a transport block received within a period, the maximum number transport blocks received within a period, the maximum number of bits transmitted within a period, the maximum number of bits of a transport block transmitted within a period, the maximum number of transport blocks transmitted within a period, the maximum data rate, the number of soft channel bits, a buffer size, or a duplex mode.

Preferably in some implementations, the UE processing time comprises the second UE processing time, and at least one value range, which is associated with the second UE processing time and is applied on at least one of a first slot offset between first DCI and a PDSCH scheduled by the first DCI, a second slot offset between second DCI and a PUSCH scheduled by the second DCI, the minimum value of the first slot offset, the minimum value of the second slot offset, a third slot offset between a PDSCH and a HARQ, an aperiodic CSI reference signal triggering offset, or a sounding reference signal offset is greater than the at least one value range which is associated with the first UE processing and is applied on at least one of the first slot offset, the second slot offset, the minimum value of the first slot offset, the minimum value of the second slot offset, the third slot offset, the aperiodic CSI reference signal triggering offset or the sounding reference signal offset.

The present disclosure relates to a wireless communication method for use in a wireless network node. The wireless communication method comprises:
  receiving, from a wireless terminal, information associated with a user equipment (UE) capability,
  determining a UE processing time based on the information and a first condition, and
  performing at least one transmission based on the UE processing time,
  wherein the UE processing time comprises one of a first UE processing time, a second UE processing time or a third UE processing time.

Various embodiments may preferably implement the following features:

Preferably in some implementations, the wireless communication method further comprises transmitting, to the wireless terminal, a high layer signaling indicating one of the first UE processing time, the second UE processing time or the third UE processing time as the UE processing time.

Preferably in some implementations, the second UE processing time is greater than at least one of the first UE processing time or the third UE processing time.

Preferably in some implementations, the second UE processing time is greater than the first UE processing time and smaller than 10 times of the first UE processing time.

Preferably in some implementations, the second UE processing time is greater than or equal to 2 times of the third UE processing time and is smaller than 20 times of the third UE processing time.

Preferably in some implementations, each UE processing time comprises at least one of a physical downlink shared channel (PDSCH) processing time, a physical uplink shared channel (PUSCH) preparation procedure time, a medium access control control element (MAC CE) processing time, a channel state information (CSI) computation time, or a physical downlink control channel (PDCCH) decoding time.

Preferably in some implementations, the PDSCH processing time corresponding to the second UE processing time is associated with at least one of a PDSCH dedicated demodulation reference signal (DMRS) a subcarrier spacing (SCS), a PDSCH mapping type, a type of frequency range (FR), a high layer signaling, the PDSCH processing time corresponding to the first UE processing time, a user equipment, UE, capability of the wireless terminal, a UE type of the wireless terminal, a UE category of the wireless terminal, or a scaling factor.

Preferably in some implementations, the PDSCH processing time has a positive relationship with the SCS.

Preferably in some implementations, the PDSCH processing time corresponding to a first SCS is greater or equal to 1.1 times of the PDSCH processing time corresponding to a second SCS and is smaller than 10 times of the PDSCH process time corresponding to the second SCS, and the first SCS is greater than the second SCS.

Preferably in some implementations, the UE processing time comprises the PDSCH processing time of the second UE processing time, a first time period associated with the second UE processing time is greater than the first time period associated with the first UE processing time, and the first time period is associated with the UE processing time and comprises at least one of: the minimum time between the last symbol of a PDSCH corresponding to a system information radio network temporary identifier (SI-RNTI) and a starting symbol of a re-transmission of a PDSCH before the PDSCH, a time duration from the last symbol of a PDCCH to the first symbol of corresponding hybrid automatic repeat request acknowledge (HARQ-ACK) information, a time duration between the last symbol of second downlink control information (DCI) which indicate a second resource of a PUCCH and the first symbol of a PUCCH resource which is indicated by first DCI and the wireless terminal multiplexes HARQ-ACK information corresponding to the second DCI format in, or a time duration in a physical random access channel (PRACH) procedure.

Preferably in some implementations, the PUSCH preparation procedure time corresponding to the second UE processing time is associated with at least one of a SCS, the PUSCH preparation procedure time corresponding to the first UE processing time, the UE capability of the wireless terminal, a UE type of the wireless terminal, a UE category of the wireless terminal, a high layer signaling, or a type of FR.

Preferably in some implementations, the PUSCH processing time corresponding to a first SCS is greater or equal to 1.1 times of the PUSCH processing time corresponding to a second SCS and is smaller than 10 times of the PUSCH processing time corresponding to the second SCS, and wherein the first SCS is greater than the second SCS.

Preferably in some implementations, the UE processing time comprises the PUSCH processing time of the second UE processing time, a second time period associated with the second UE processing time is greater than the second time period associated with the first UE processing time, and the second time period is associated with the UE processing time and comprises at least one of a time period between a PDCCH and a corresponding PRACH, or a time period between a slot in which a timing advance command is received and an uplink transmission applying the timing advance command.

Preferably in some implementations, the MAC CE processing time corresponding to the second UE processing time is associated with at least one of the number of slots per subframe, the MAC CE processing time corresponding to the first UE processing, a predefined value, a UE capability or a high layer signaling.

Preferably in some implementations, the UE processing time comprises the MAC CE processing time of the second UE processing time, a third time period associated with the second UE processing time is greater than the third time period associated with the first UE processing time, and the third time period is associated with the UE processing time and is between a PUCCH with HARQ-ACK information corresponding to a PDSCH and a slot in which an indication carried by the PDSCH is applied.

Preferably in some implementations, the indication comprises at least one of: an activation command indicating a mapping between transmission configuration states and codepoints of a field in DCI, the indication comprises an activation command indicating a semi-persistent reporting setting, an activation command for a secondary cell, or the indication comprises a deactivation command indicating at least one of a semi-persistent CSI reference signal resource set deactivation or a CSI interference measurement resource set deactivation.

Preferably in some implementations, the CSI computation time corresponding to the second UE processing time is associated with at least one of a report quantity of CSI, the UE capability of the wireless terminal, a high layer signaling, an index of report of CSI, a SCS, a frequency granularity of CSI, or the number of simultaneous CSI calculations supported by the wireless terminal.

Preferably in some implementations, the PDCCH decoding time corresponding to the second UE processing time is associated with a SCS, a control resource set (CORSET), a search space set, a DCI format, a radio network temporary identifier (RNTI), the UE capability of the wireless terminal, a UE type of the wireless terminal, a predefined value, a high layer signaling or a UE category of the wireless terminal.

Preferably in some implementations, the UE processing time comprises the PDCCH decoding time processing time of the second UE processing time, a fourth time period associated with the second UE processing time is greater than the fourth time period associated with the first UE processing time, and the fourth time period associated with the UE processing time comprises at least one of a bandwidth part (BWP), switch delay time, a beam switch time, a beam report time, a slot format indication, SFI, apply time, a channel occupancy (CO), apply time, a time duration for quasi co-location (QCL), a search space switch apply time, a cross-slot scheduling application delay time, the minimum time gap, a power saving offset.

Preferably in some implementations, the first condition is associated with at least one of a high layer signaling, the UE capability, a UE type, a UE category, DCI, a radio network temporary identifier, a modulation order, a BWP, a transport block size, a CORESET, a search space set, or at least one of a sequence, a resource or a format of a random access preamble.

Preferably in some implementations, the UE capability indicates supporting the second UE processing time, the higher layer signaling indicates enabling the second UE processing time and the UE processing time comprises the second UE processing time.

Preferably in some implementations, the UE capability indicates supporting the third UE processing time, the higher layer signaling indicates enabling the third UE processing time and the UE processing time comprises the third UE processing time.

Preferably in some implementations, the UE capability indicates not supporting the third UE processing time, the higher layer signaling indicates not enabling the third UE processing time and the UE processing time comprises the first UE processing time.

Preferably in some implementations, the first condition is associated with at least one of the DCI scheduling a PDSCH or the modulation order, and the DCI indicates the modulation order is greater than a threshold and the UE processing time comprises the first UE processing time or the third UE processing time, or the DCI indicates the modulation order is smaller than or equal to the threshold and the UE processing time comprises the second UE processing time.

Preferably in some implementations, a bandwidth of the BWP is greater than a threshold and the UE processing time comprises the first UE processing time or the third UE processing time, or the bandwidth of the BWP is smaller or equal to the threshold and the UE processing time comprises the second UE processing time.

Preferably in some implementations, the first condition of the wireless terminal is associated with a pre-defined UE category and the UE processing refers to the second UE processing time.

Preferably in some implementations, the pre-defined UE category comprises a reduced-capability UE.

Preferably in some implementations, the predefined UE category is associated with a bandwidth supported by the wireless terminal, the maximum multiple-input-multiple-output layer, the maximum rank, the number of ports, the maximum number of HARQ processes, the maximum modulation order, the maximum code rate, the maximum number of bits received within a period, the maximum number of bits of a transport block received within a period, the maximum number transport blocks received within a period, the maximum number of bits transmitted within a period, the maximum number of bits of a transport block transmitted within a period, the maximum number of transport blocks transmitted within a period, the maximum data rate, the number of soft channel bits, a buffer size, or a duplex mode.

Preferably in some implementations, the UE processing time comprises the second UE processing time, and at least one value range, which is associated with the second UE processing time and is applied on at least one of a first slot offset between first DCI and a PDSCH scheduled by the first DCI, a second slot offset between second DCI and a PUSCH scheduled by the second DCI, the minimum value of the first slot offset, the minimum value of the second slot offset, a third slot offset between a PDSCH and a HARQ, an aperiodic CSI reference signal triggering offset, or a sounding reference signal offset is greater than the at least one value range which is associated with the first UE processing and is applied on at least one of the first slot offset, the second slot offset, the minimum value of the first slot offset, the minimum value of the second slot offset, the third slot offset, the aperiodic CSI reference signal triggering offset or the sounding reference signal offset.

The present disclosure relates to a wireless terminal, comprising:
 a communication unit, configured to transmit, to a wireless network node, information associated with a user equipment (UE) capability, and
 a processor configured to:
 determine a UE processing time based on the information and a first condition, and
 perform at least one transmission based on the UE processing time,
 wherein the UE processing time comprises one of a first UE processing time, a second UE processing time or a third UE processing time.

Various embodiments may preferably implement the following feature:
Preferably in some implementations, the processor is further configured to perform a wireless communication method of any of the foregoing described methods.

The present disclosure relates to a wireless network node, comprising:
 a communication unit, configured to receive, from a wireless terminal, information associated with a user equipment (UE) capability, and
 a processor configured to:
 determine a UE processing time based on the information and a first condition, and
 perform at least one transmission based on the UE processing time,
 wherein the UE processing time comprises one of a first UE processing time, a second UE processing time or a third UE processing time.

Various embodiments may preferably implement the following feature:
Preferably, the processor is further configured to perform a wireless communication method of any of the foregoing described methods.

The present disclosure relates to a computer program product comprising a computer-readable program medium code stored thereupon, the code, when executed by a processor, causing the processor to implement a wireless communication method recited in any of foregoing methods.

The example embodiments disclosed herein are directed to providing features that will become readily apparent by reference to the following description when taken in conjunction with the accompany drawings. In accordance with various embodiments, example systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the example embodiments and applications described and illustrated herein. Additionally, the specific order and/or hierarchy of steps in the methods disclosed herein are merely example approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

DETAILED DESCRIPTION OF THE DRAWINGS

FIG. 1A-C illustrate different processing times according to embodiments of the present disclosure.

DETAILED DESCRIPTION

In LTE (long-term evolution) and NR (new radio), DRX (Discontinuous Reception) may be used for power saving in terminals (or user equipments, UEs).

The basic mechanism of DRX is configuring a DRX cycle for the UE and a drx-ondurationTimer begins in a DRX cycle. During the drx-ondurationTimer, the UE is in 'DRX On' state and continues monitoring PDCCH (Physical downlink control channel). If UE successfully decodes a PDCCH, the UE stays awake (in 'DRX On' state) and starts the inactivity timer. The UE may go to sleep (in 'DRX off' state) after the drx-ondurationTimer or the drx-inactivity-Timer expired. In 'DRX off' state, the UE does not monitor PDCCH to save power.

In NR, more power saving techniques are proposed, for example, DCI (Downlink Control Information) format 2_6 used for notifying the power saving information (e.g., wake-up indication) outside DRX Active Time for one or more UE; a field in DCI format 0_1 and 1_1 can be used to indicate minimum applicable scheduling offset (cross slot scheduling), DCI format 0_1 or 1_1 or 2_6 can be used to indicate a SCell (secondary cell) dormancy, etc.

However, the UE still needs to follow PDSCH (Physical downlink shared channel) processing time N1 and/or PUSCH (Physical uplink shared channel) preparation procedure time N2 to process data and the power saving gain is limited.

Figure 1A:
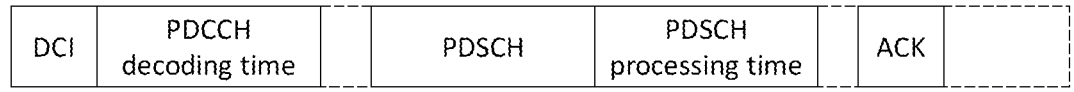
Figure 1B:
Figure 1C:
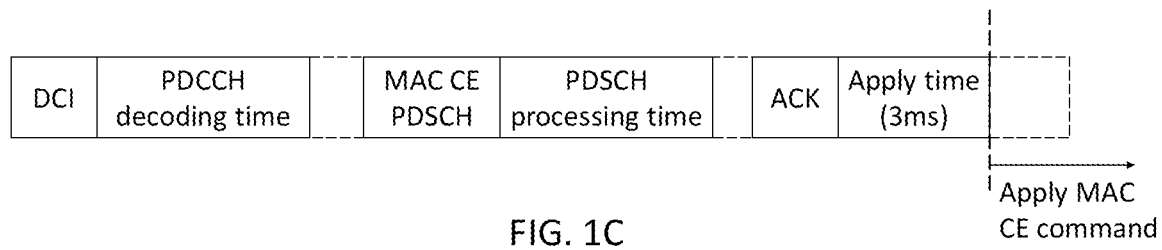

With reference to FIGS. 1A-C, existing processing times are described in more detail. FIG. 1A illustrates PDSCH processing time N1. FIG. 1B illustrates PUSCH preparation procedure time N2. FIG. 1C illustrates MAC (Medium Access Control) CE (Control Element) processing time. In addition, CSI computation time and PDCCH decoding time are also briefly described below.

The PDSCH processing time N1 relates to the number of symbols for UE to process PDSCH. In particular, the PDSCH processing time N1 is a parameter used to calculate the minimum time gap between the end of the last symbol of the PDSCH carrying the transport block (TB) being acknowledged and the first uplink symbol of the physical uplink control channel (PUCCH) which carriers the Hybrid automatic repeat request acknowledgement (HARQ-ACK) information.

Table 1 shows first kind UE processing time of PDSCH processing time and third kind ULE processing time of PDSCH.

TABLE 1

First kind UE processing time of PDSCH processing time (PDSCH processing capability 1)

| | PDSCH decoding time $N_1$ [symbols] | |
| --- | --- | --- |
| $\mu$ | dmrs-AdditionalPosition = pos0 in DMRS-DownlinkConfig in both of dmrs-DownlinkForPDSCH-MappingTypeA, dmrs-DownlinkForPDSCH-Mapping TypeB | dmrs-AdditionalPosition ≠ pos0 in DMRS-DownlinkConfig in either of dmrs-DownlinkForPDSCH-MappingTypeA, dmrs-Downlink ForPDSCH-Mapping TypeB or if the higher layer parameter is not configured |
| 0 | 8 | $N_{1,0}$ |
| 1 | 10 | 13 |
| 2 | 17 | 20 |
| 3 | 20 | 24 |

Third kind UE processing time of PDSCH processing time (PDSCH processing capability 2)

| $\mu$ | PDSCH decoding time $N_1$ [symbols] dmrs-AdditionalPosition = pos0 in DMRS-DownlinkConfig in both of dmrs-DownlinkForPDSCH-MappingTypeA, dmrs-DownlinkForPDSCH-Mapping TypeB |
| --- | --- |
| 0 | 3 |
| 1 | 4.5 |
| 2 | 9 for frequency range 1 |

In table 1, If the PDSCH DM-RS position 1 for the additional DM-RS is l=12, $N_{1,0}$=14; otherwise $N_{1,0}$=13.

The PUSCH preparation procedure time N2 is a number of symbols. In particular, the PUSCH preparation procedure time N2 is used to calculate the minimum time gap between the end of the reception of the last symbol of the PDCCH carrying the downlink control information (DCI) scheduling the PUSCH and the first uplink symbol in the PUSCH.

Table 2 shows first kind LUE processing time of PUSCH preparation time and third kind ULE processing time of PUSCH preparation time.

TABLE 2

First kind UE processing time of PUSCH preparation time ( PUSCH timing capability 1)

| $\mu$ | PUSCH preparation time $N_2$ [symbols] |
| --- | --- |
| 0 | 10 |
| 1 | 12 |

TABLE 2-continued

| | |
|---|---|
| 2 | 23 |
| 3 | 36 |

| Third kind UE processing time of PUSCH preparation time (PUSCH timing capability 2) | |
|---|---|
| $\mu$ | PUSCH preparation time $N_2$ [symbols] |
| 0 | 5 |
| 1 | 5.5 |
| 2 | 11 for frequency range 1 |

The MAC CE processing time (applying time in FIG. 1C) relates to the time between a PUCCH with HARQ-ACK information and the slot applying the command carried by PDSCH.

The CSI computation time relates to a number of symbols. It is used to calculate the minimum time gap between the end of the last symbol of the PDCCH triggering a CSI report and the uplink symbol of the CSI report. It is also used to calculate the minimum time gap between the end of the last symbol in time of the latest: aperiodic channel state information reference signal (CSI-RS) resource for channel measurements, aperiodic CSI-Interference Measurement (IM) used for interference measurements, and aperiodic non zero power (NZP) CSI-RS for interference measurement and the first uplink symbol of n-th CSI report.

Table 3 shows first kind UE processing time of CSI computation delay requirement 1 and 2.

TABLE 3

| First kind UE processing time of CSI computation delay requirement 1 | | |
|---|---|---|
| | $Z_1$ [symbols] | |
| $\mu$ | $Z_1$ | $Z'_1$ |
| 0 | 10 | 8 |
| 1 | 13 | 11 |
| 2 | 25 | 21 |
| 3 | 43 | 36 |

| First kind UE processing time of CSI computation delay requirement 2 | | | | | | |
|---|---|---|---|---|---|---|
| | $Z_1$ [symbols] | | $Z_2$ [symbols] | | $Z_3$ [symbols] | |
| | $Z_1$ | $Z'_1$ | $Z_2$ | $Z'_2$ | $Z_3$ | $Z'_3$ |
| | 22 | 16 | 40 | 37 | 22 | $X_0$ |
| | 33 | 30 | 72 | 69 | 33 | $X_1$ |
| | 44 | 42 | 141 | 140 | min(44, $X_2$ + $KB_1$) | $X_2$ |
| 3 | 97 | 85 | 152 | 140 | min(97, $X_3$ + $KB_2$) | $X_3$ |

In table 3, $X_0$, $X_1$, $X_2$, and/or $X_3$ is determined according to UE reported capability beamReportTiming. In addition, $KB$, is determined also according to UE reported capability beamReportTiming.

The PDCCH decoding time relates to time used for UE to decode a PDCCH/DCI and is represented in the number of symbols/slots.

Figure 2:
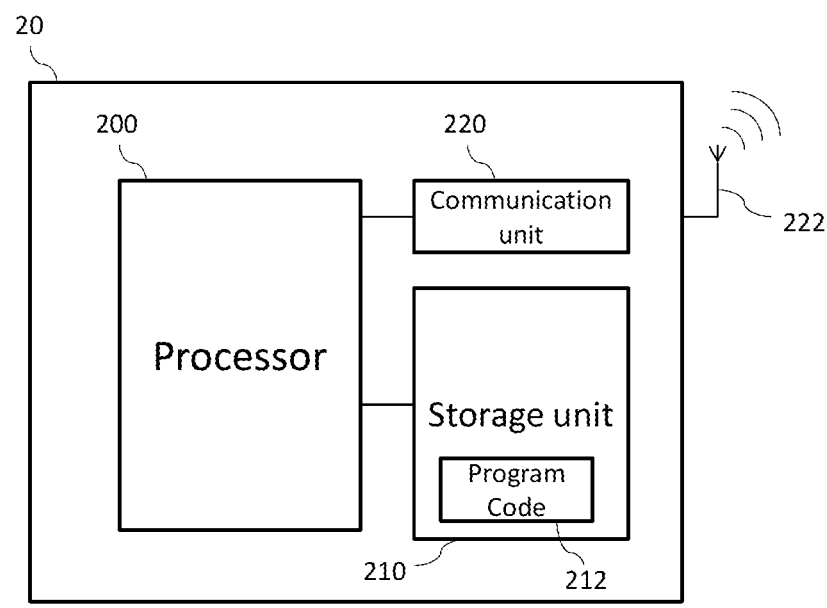
FIG. 2 shows an example of a schematic diagram of a wireless terminal according to an embodiment of the present disclosure.

FIG. 2 relates to a schematic diagram of a wireless terminal 20 according to an embodiment of the present disclosure. The wireless terminal 20 may be a user equipment (UE), a mobile phone, a laptop, a tablet computer, an electronic book or a portable computer system and is not limited herein. The wireless terminal 20 may include a processor 200 such as a microprocessor or Application Specific Integrated Circuit (ASIC), a storage unit 210 and a communication unit 220. The storage unit 210 may be any data storage device that stores a program code 212, which is accessed and executed by the processor 200. Embodiments of the storage unit 210 include but are not limited to a subscriber identity module (SIM), read-only memory (ROM), flash memory, random-access memory (RAM), hard-disk, and optical data storage device. The communication unit 220 may a transceiver and is used to transmit and receive signals (e.g. messages or packets) according to processing results of the processor 200. In an embodiment, the communication unit 220 transmits and receives the signals via at least one antenna 222 shown in FIG. 2.

In an embodiment, the storage unit 210 and the program code 212 may be omitted and the processor 200 may include a storage unit with stored program code.

The processor 200 may implement any one of the steps in exemplified embodiments on the wireless terminal 20, e.g., by executing the program code 212.

The communication unit 220 may be a transceiver. The communication unit 220 may as an alternative or in addition be combining a transmitting unit and a receiving unit configured to transmit and to receive, respectively, signals to and from a wireless network node (e.g. a base station).

Figure 3:
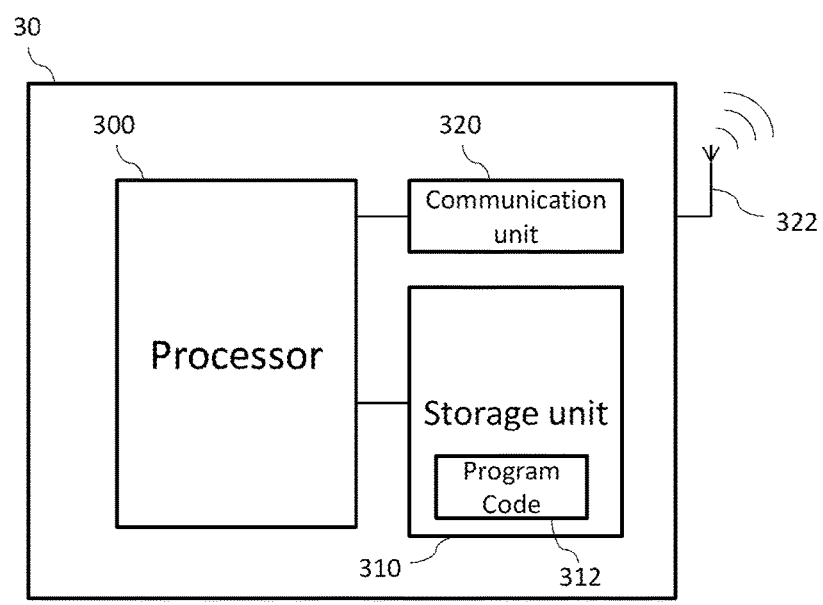
FIG. 3 shows an example of a schematic diagram of a wireless network node according to an embodiment of the present disclosure.

FIG. 3 relates to a schematic diagram of a wireless network node 30 according to an embodiment of the present disclosure. The wireless network node 30 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless network node 30 may comprise (perform) at least one network function such as an access and mobility management function (AMF), a session management function (SMF), a user place function (UPF), a policy control function (PCF), an application function (AF), etc. The wireless network node 30 may include a processor 300 such as a microprocessor or ASIC, a storage unit 310 and a communication unit 320. The storage unit 310 may be any data storage device that stores a program code 312, which is accessed and executed by the processor 300. Examples of the storage unit 310 include but are not limited to a SIM, ROM, flash memory, RAM, hard-disk, and optical data storage device. The communication unit 320 may be a transceiver and is used to transmit and receive signals (e.g. messages or packets) according to processing results of the processor 300. In an example, the communication unit 320 transmits and receives the signals via at least one antenna 322 shown in FIG. 3.

In an embodiment, the storage unit 310 and the program code 312 may be omitted. The processor 300 may include a storage unit with stored program code.

The processor 300 may implement any steps described in exemplified embodiments on the wireless network node 30, e.g., via executing the program code 312.

The communication unit 320 may be a transceiver. The communication unit 320 may as an alternative or in addition be combining a transmitting unit and a receiving unit configured to transmit and to receive, respectively, signals to and from a wireless terminal (e.g. a user equipment).

In general, in an embodiment, a more relaxed UE processing time is provided, wherein UE may save power using the relaxed UE processing time.

The following description relates to the user equipment side or a gNB side.

In particular, a method related to applying a UE processing time based on a first condition is provided.

In some embodiments, a procedure related to applying or using the UE processing time may include at least one of determining the UE processing time and performing/applying the UE processing time, e.g. on scheduling transmissions.

In some embodiments, the UE processing time includes a first UE processing time, a second UE processing time, and a third UE processing time.

In some embodiments, UE performing based on second UE processing time may allow for possible slower processor with reduced clock frequency, or possible reduced hardware process for computation and saving power.

In some embodiments, each UE processing time includes at least one of the following: Physical downlink shared channel (PDSCH) processing time N1, Physical uplink shared channel (PUSCH) preparation procedure time N2, MAC (Medium Access Control) CE (Control Element) processing time, Channel state information (CSI) computation time, or Physical downlink control channel (PDCCH) decoding time.

In particular, according to an embodiment, the second UE processing time is provided in addition to the first and third mentioned above. The second UE processing time allows a more relaxed time than the first UE processing time. The third UE processing time only includes N1 and N2.

In some embodiments, the second UE processing time is greater than or equal to at least one of the first UE processing time or the third UE processing time.

In some embodiments, the second UE processing time is greater than or equal to the first UE processing time and smaller than 10 times of the first UE processing time. For example, the second UE processing time may be greater than or equal to 1.5 times of the first UE processing time.

In some embodiments, the second UE processing time is greater than or equal to 2 times of the third UE processing time and is smaller than 20 times of the third UE processing time. For instance, the second UE processing time may be greater than or equal to 3 times of the third UE processing time.

In some embodiments, performing/applying the UE processing time may represent that the UE does not expect to receive a PDSCH scheduling indication which does not follow the N1 in the UE processing time. In some embodiments, performing/applying the UE processing time means that the UE does not expect to receive a PUSCH scheduling indication not following the N2 in the UE processing time. In some embodiments, performing/applying the UE processing time means that the UE does not expect to process a CSI report which does not follow the CSI computation time in the UE processing time. In some embodiments, performing/applying the UE processing time means that the UE does not expect to apply an indication carried by a PDSCH until the time between a PUCCH with HARQ-ACK information and the slot applying the command carried by this PDSCH satisfies the MAC CE processing time in the UE processing time. In some embodiments, performing/applying the UE processing time means that the UE does not expect to finish decoding a DCI or apply the indication carried by the DCI until the PDCCH decoding time in the UE processing time satisfied.

In some embodiments, if one of times (e.g. N1, N2, MAC CE processing time, CSI computation time, and PDCCH decoding time) in the UE processing time is applied, one or more of the remaining times in corresponding UE processing time may also be applied. For example, if N1 in the second UE processing time is applied, the PDCCH decoding time in second UE processing time may also be applied.

Next, a definition of the second UE processing time is provided.

In some embodiments, the characteristics of the second UE processing time comprises at least one of the following: PDSCH processing time N1 in the second UE processing time is larger than or equal to the PDSCH processing time N1 in the first UE processing time; PUSCH preparation procedure time N2 in the second UE processing time is larger than or equal to the PUSCH preparation procedure time N2 in the first UE processing time; MAC CE processing time in the second UE processing time is larger than or equal to the MAC CE processing time in the first UE processing time; CSI computation time in the second UE processing time is larger than or equal to the CSI computation time in the first UE processing time; or PDCCH decoding time in the second UE processing time is larger than or equal to the PDCCH decoding time in the first UE processing time.

In some embodiments, the PDSCH processing time N1 in the second UE processing time is associated with at least one of the following: PDSCH Dedicated demodulation reference signal (DMRS), subcarrier space (SCS), PDSCH mapping type, frequency range (FR) type, a high layer signaling, PDSCH processing time in first UE processing time, UE capability, UE type (or UE category), or a scaling factor.

In the present disclosure, the UE capability may be equal to UE type or UE category.

In some embodiments, the value of PDSCH processing time in the second UE processing time is associate with at least a UE capability.

In some embodiments, the N1 in second UE processing time has more than one kind of value. For example, if UE reports support of a first UE capability, a first kind of value of N1 in the second UE processing time is applied. If UE reports support of a second UE capability, a second kind of value of N1 in the second UE processing time is applied.

In some embodiments, the first or second UE capability may include supported maximum latency, maximum data rate, maximum modulation order or use case. The maximum latency, maximum data rate, maximum modulation order or use case is different in the first and second UE capability.

As another example, if UE reports supporting a first UE capability, a first kind of value of N1 in the second UE processing time is applied. If UE reports support of a second UE capability, a second kind of value of N1 in the second UE processing time is applied. If UE reports support of a third UE capability, the N1 in first UE processing time is applied.

In some embodiments, the first, second or third UE capability may include supported maximum latency, maximum data rate, maximum modulation order or use case. The maximum latency, maximum data rate, maximum modulation order or use case is different in the first, second and third UE capability.

In some embodiments, if UE reports support of a first or second UE capability, the N1 in second UE processing time will be applied. If UE reports support of a third UE capability, the N1 in first UE processing time will be applied.

In some embodiments, the maximum latency in the first capability is greater than the maximum latency in the second capability. In some embodiments, the maximum latency in the second capability is greater than the maximum latency in the third capability.

In some embodiments, the maximum data rate or maximum modulation order in the first capability is less than the maximum data rate or maximum modulation order in the second capability. In some embodiments, the maximum data rate or maximum modulation order in the second capability is less than the maximum data rate or maximum modulation order in the third capability.

In some embodiments, use case in first or second capability is associated with a reduced-capability use case (e.g., industrial wireless sensors, video surveillance, and wearables).

In some embodiments, the value of PDSCH processing time in the second UE processing time is associate with at least a UE type. For example, if the UE is a first kind UE type, a second kind UE processing time is applied, otherwise, the first or third UE processing time is applied.

In some embodiments, a first kind UE type is a reduced capability UE (e.g., industrial wireless sensors, video surveillance, or wearables), a UE support reduced capability, a NR light UE, UE with limited bandwidth or UE with coverage enhancement.

In some embodiments, PDSCH processing time N1 is associated with at least the SCS (as shown in Table 4 below).

TABLE 4

| μ | PDSCH processing time N1(symbols) |
|---|---|
| 0 | Value 1 |
| 1 | Value 2 |
| 2 | Value 3 |
| 3 | Value 4 |

In Table 4, μ is numerology, wherein μ=0 means SCS=15 kHz; μ=1 means SCS=30 kHz; μ=2 means SCS=60 kHz; μ=3 means SCS=120 kHz.

In some embodiments, a larger SCS is associated with a large N1. That is, the SCS and N1 have a positive relationship.

In some embodiments, each N1 candidate value is a multiple of X, wherein X is greater than 0. For example, X=1.5 or 4. In one example, value 1=20, value 2=24, value 3=32, value 4=36.

In some embodiments, the N1 corresponding to a first SCS is greater or equal to 1.1 times of the N1 corresponding to a second SCS and is smaller than 10 times of the N1 corresponding to the second SCS, wherein the first SCS is greater than the second SCS. For example, the N1 corresponding to the first SCS may be greater than or equal to 1.25 times of the N1 corresponding to the second SCS.

In some embodiments, PDSCH processing time N1 is associated with at least a PDSCH DRMS, wherein PDSCH DRMS includes at least one of the following: a high layer configuration and DMRS position.

In some embodiments, N1 has different values for dmrs-AdditionalPosition=pos0 and dmrs-AdditionalPosition≠pos0 (as shown in Table 5 below).

TABLE 5

| μ | PDSCH processing time N1(symbols) dmrs-AdditionalPosition = pos0 in DMRS-DownlinkConfig in both of dmrs-DownlinkForPDSCH-MappingTypeA, dmrs-DownlinkForPDSCH-Mapping TypeB | PDSCH processing time N1(symbols) dmrs-AdditionalPosition ≠ pos0 in DMRS-DownlinkConfig in both of dmrs-DownlinkForPDSCH-MappingTypeA, dmrs-DownlinkForPDSCH-MappingTypeB, or if the high layer signaling is not configure |
|---|---|---|
| 0 | Value 1 | Value 5 |
| 1 | Value 2 | Value 6 |
| 2 | Value 3 | Value 7 |
| 3 | Value 4 | Value 8 |

Each N1 value for dmrs-AdditionalPosition≠pos0 is larger than the N1 value for dmrs-AdditionalPosition=pos0, which is associate with the same numerology (this is because dmrs-AdditionalPosition≠pos0 means PDSCH has more than one DMRS position in one slot and it may take UE more time to decode a PDSCH).

In some embodiments, N1 value for dmrs-AdditionalPosition≠pos0 (Value_type2) is associated with the N1 value for dmrs-AdditionalPosition=pos0 (Value_type1), which is associated with the same numerology. For example, Value_type2=Value_type1+d, wherein d is greater than 0, for example, d=3, 4, or 5.

In some embodiments, the N1 value for dmrs-AdditionalPosition=pos0 in second UE processing time (A1) is associate with the N1 value for dmrs-AdditionalPosition≠pos0 in first UE processing time (A2). In one example, A1=A2. In another example, A1=A2+t, wherein t is greater than 0 and less than 50.

In some embodiments, the N1 value may be different for different dmrs-AdditionalPosition configuration (as shown in Table 6 below).

TABLE 6

| μ | PDSCH processing time N1(symbols) dmrs-AdditionalPosition = pos0 in DMRS-DownlinkConfig in both of dmrs-DownlinkForPDSCH-MappingTypeA, dmrs-DownlinkForPDSCH-MappingTypeB | PDSCH processing time N1(symbols) dmrs-AdditionalPosition = pos1 in DMRS-DownlinkConfig in both of dmrs-DownlinkForPDSCH-MappingTypeA, dmrs-DownlinkForPDSCH-MappingTypeB | PDSCH processing time N1(symbols) dmrs-AdditionalPosition = not configured | PDSCH processing time N1(symbols) dmrs-AdditionalPosition = pos3 in DMRS-DownlinkConfig in both of dmrs-DownlinkForPDSCH-MappingTypeA, dmrs-DownlinkForPDSCH-MappingTypeB |
|---|---|---|---|---|
| 0 | Value 1 | Value 5 | Value 9 | Value 13 |

TABLE 6-continued

| μ | PDSCH processing time N1(symbols) dmrs-AdditionalPosition = pos0 in DMRS-DownlinkConfig in both of dmrs-DownlinkForPDSCH-MappingTypeA, dmrs-DownlinkForPDSCH-MappingTypeB | PDSCH processing time N1(symbols) dmrs-AdditionalPosition = pos1 in DMRS-DownlinkConfig in both of dmrs-DownlinkForPDSCH-MappingTypeA, dmrs-DownlinkForPDSCH-MappingTypeB | PDSCH processing time N1(symbols) dmrs-AdditionalPosition = not configured | PDSCH processing time N1(symbols) dmrs-AdditionalPosition = pos3 in DMRS-DownlinkConfig in both of dmrs-DownlinkForPDSCH-MappingTypeA, dmrs-DownlinkForPDSCH-MappingTypeB |
|---|---|---|---|---|
| 1 | Value 2 | Value 6 | Value 10 | Value 14 |
| 2 | Value 3 | Value 7 | Value 11 | Value 15 |
| 3 | Value 4 | Value 8 | Value 12 | Value 16 |

In some embodiments, for the same numerology, the N1 value for dmrs-AdditionalPosition=pos3 is not smaller than the N1 value for dmrs-AdditionalPosition not configured, the N1 value for dmrs-AdditionalPosition not configured is not smaller than the N1 value for dmrs-AdditionalPosition=pos1, the N1 value for dmrs-AdditionalPosition=pos1 is not smaller than N1 value for dmrs-AdditionalPosition=pos0.

In some embodiments, the N1 value for dmrs-AdditionalPosition≠pos0 is associate with dmrs-AdditionalPosition=pos0 (value_1). For example, N1 value for dmrs-AdditionalPosition=pos1 is equal to value_1+d, the N1 value for dmrs-AdditionalPosition=pos3 is equal to value_1+X2*d, the N1 value for dmrs-AdditionalPosition not configured is equal to value_1+X1*d. X1, X2, d are greater than 0. In some embodiments, X1≤X2.

In some embodiments, an N1 value in the second UE processing time is associate with at least one of an N1 value in the first UE processing time and a scaling factor.

For example, each N1 value in the second UE processing time is equal to an N1 value in the first UE processing time with the same dmrs-AdditionalPosition and the same SCS configuration added with d1, wherein d1 is greater than 0.

In another example, each N1 value in the second UE processing time with dmrs-AdditionalPosition=pos0 in DMRS-DownlinkConfig in both of dmrs-DownlinkForPDSCH-MappingTypeA, dmrs-DownlinkForPDSCH-MappingTypeB is equal to an N1 value in the first UE processing time with the same dmrs-AdditionalPosition and the same SCS configuration added with d2, wherein d2 is greater than 0. Each N1 value in the second UE processing time with dmrs-AdditionalPosition≠pos0 in DMRS-DownlinkConfig in both of dmrs-DownlinkForPDSCH-MappingTypeA, dmrs-DownlinkForPDSCH-MappingTypeB is equal to an N1 value in the first UE processing time with the same dmrs-AdditionalPosition and the same SCS configuration added with d3, wherein d3 is greater than 0.

In another example, each N1 value in the second UE processing time with dmrs-AdditionalPosition=pos0 in DMRS-DownlinkConfig in both of dmrs-DownlinkForPDSCH-MappingTypeA, dmrs-DownlinkForPDSCH-MappingTypeB is equal to an N1 value in the first UE processing time with the same dmrs-AdditionalPosition and the same SCS configuration multiplied by a d2, wherein d2 is greater than 0. Each N1 value in the second UE processing time with dmrs-AdditionalPosition≠pos0 in DMRS-DownlinkConfig in both of dmrs-DownlinkForPDSCH-MappingTypeA, dmrs-DownlinkForPDSCH-MappingTypeB is equal to an N1 value in the first UE processing time with the same dmrs-AdditionalPosition and the same SCS configuration multiplied by d3, wherein d3 is greater than 0.

In some embodiments, d2=d3.

In some embodiments, d1, d2 or d3 are associated with at least a SCS, a UE capability or a UE type (or UE category).

In some embodiments, PDSCH processing time N1 in the second UE processing time is configured by a high layer signaling.

In some embodiments, N1 in the second UE processing time is different for different PDSCH mapping types. For example, N1 in the second UE processing time associated with PDSCH mapping type A is greater than N1 in the second UE processing time associated with PDSCH mapping type B.

In some embodiments, N1 in the second UE processing time is determined at least based on FR type. For example, N1 in the second UE processing time associated with FR 2 is greater than N1 in the second UE processing time associated with FR 1.

Next, PUSCH preparation procedure time N2 in the second UE processing time is described in accordance with various embodiments.

In some embodiments, the PUSCH preparation procedure time N2 in the second UE processing time is associate with at least one of the following: SCS, PUSCH preparation procedure time N2 in the first UE processing time, UE capability, UE type (or UE category), a high layer signaling, and FR type.

In some embodiments, the value of PUSCH preparation procedure time N2 in the second UE processing time is associate with a UE capability.

In some embodiments, the second UE processing time may have more than one kind of value. For example, if UE reports support of the first UE capability, a first kind of value of the second UE processing time is applied. If UE reports support of the second UE capability, a second kind of value of the second UE processing time is applied. The first or second UE capability may include supported maximum latency, maximum data rate, maximum modulation order or use case. The maximum latency, maximum data rate, maximum modulation order or use case may be different in the first and second UE capability.

In another example, if UE reports support of the first UE capability, a first kind of value of the second UE processing time is applied. If UE reports support of the second UE capability, a second kind of value of second UE processing time is applied. If UE reports support of the third UE capability, the first UE processing time is applied. The first, second or third UE capability may include supported maximum latency, maximum data rate, maximum modulation order or use case. The maximum latency, maximum data rate, maximum modulation order or use case is different in the first, second and third UE capability.

In some embodiments, if UE reports support of the first or second UE capability, the second UE processing time will be applied. If UE reports support of the third UE capability, the first UE processing time will be applied.

In some embodiments, the maximum latency in the first capability is greater than the maximum latency in the second capability. In some embodiments, the maximum latency in the second capability is greater than the maximum latency in the third capability.

In some embodiments, the maximum data rate or maximum modulation order in the first capability is less than the maximum data rate or maximum modulation order in the second capability. In some embodiments, the maximum data rate or maximum modulation order in the second capability is less than the maximum data rate or maximum modulation order in the third capability.

In some embodiments, the use case in first or second capability is associated with a reduced-capability use case (e.g., industrial wireless sensors, video surveillance, and wearables).

In some embodiments, PUSCH preparation procedure time N2 in the second UE processing time is associate with at least a SCS.

In some embodiments, the larger SCS is associated with a larger N2 value. In other words, the N2 has a positive relationship with the SCS.

In some embodiments, the N2 corresponding to a first SCS is greater or equal to 1.1 times of the N2 corresponding to a second SCS and is smaller than 10 times of the N2 corresponding to the second SCS, wherein the first SCS is greater than the second SCS. For example, the N2 corresponding to the first SCS may be greater than or equal to 1.25 times of the N2 corresponding to the second SCS.

In some embodiments, N2 value is multiplied by a real number C. In one example, N2=$\mu \cdot$C (however, N2 value for SCS=15 kHz is not using this formula).

In another example, N2=$d_\mu \cdot$C, as shown in Table 7, wherein $d_\mu$ is a real number associate with SCS, $d_0 < d_1 < d_2 < d_3$.

TABLE 7

| $\mu$ | PUSCH preparation procedure time N2 |
| --- | --- |
| 0 | $d_0 \cdot$ C |
| 1 | $d_1 \cdot$ C |
| 2 | $d_2 \cdot$ C |
| 3 | $d_3 \cdot$ C |

In some embodiments, PUSCH preparation procedure time N2 in the second UE processing time is associated with at least the PUSCH preparation procedure time N2 in the first UE processing time.

In one example, PUSCH preparation procedure time N2 in the second UE processing time is equal to N2 in the first UE processing time with the same numerology multiplied by C$\mu$, wherein C$\mu$ is a real number associate with the numerology and greater than 1 and less than 10. As shown in Table 8 (PUSCH preparation procedure time N2 in second UE processing time).

TABLE 8

| $\mu$ | PUSCH preparation procedure time N2 |
| --- | --- |
| 0 | 10*C0 |
| 1 | 12*C1 |
| 2 | 23*C2 |
| 3 | 36*C3 |

In some embodiments, C0=C1=C2=C3, for example C0=C1=C2=C3=2.

In another example, PUSCH preparation procedure time N2 in the second UE processing time is equal to N2 in the first UE processing time with the same numerology added to D$\mu$, wherein D$\mu$ is a real number associated with the numerology and greater than 1 and less than 10.

In some embodiments, D1=D2=D3=D4.

In some embodiments, PUSCH preparation procedure time N2 in the second UE processing time is associated with a high layer signaling, which means the N2 value in the second UE processing time is configured by a high layer signaling.

In some embodiments, PUSCH preparation procedure time N2 in the second UE processing time is associated with a FR type. For example, N2 in the second UE processing time associated with FR 2 is greater than N2 in the second UE processing time associated with FR 1.

Next, MAC CE processing time in the second UE processing time is described in accordance with various embodiments.

In some embodiments, the MAC CE processing time in the second UE processing time is associated with at least one of the following: number of slots per subframe for subcarrier spacing configuration $\mu(N_{slot}^{subframe,\mu})$, MAC CE processing time in the first UE processing time, a high layer signaling, a predefined value, or a UE capability.

In some embodiments, MAC CE processing time (e.g. $T_{MAC}$) in the second UE processing time is associate with at least $N_{slot}^{subframe,\mu}$ and a predefined value. For example, $T_{MAC} = M \cdot N_{slot}^{subframe,\mu}$, wherein M is a predefined value and is an integer greater than 3 and less than 10.

In some embodiments, MAC CE processing time ($T_{MAC}$) in the second UE processing time is associated with at least MAC CE processing time ($T_{MAC\_1}$) in the first UE processing time. In one example, $T_{MAC} = T_{MAC\_1} + M1$, wherein M1 is an integer greater than 0 and less than 10. In another example, $T_{MAC} = T_{MAC\_1} \cdot M2$, wherein M2 is a real number greater than 1 and less than 10.

In some embodiments, MAC CE processing time ($T_{MAC}$) in the second UE processing time is configured by high layer signaling.

The MAC CE processing time ($T_{MAC\_1}$) in first UE processing time may be: $T_{MAC\_1} = 3 \cdot N_{slot}^{subframe,\mu}$ Next, CSI computation time in the second UE processing time is described in accordance with various embodiments.

In some embodiments, the CSI computation time in the second UE processing time is associated with at least one of the following: report quantity, UE capability, high layer signaling, index of the report, SCS, frequency granularity, or the number of supported simultaneous CSI calculations $N_{CPU}$.

In some embodiments, CSI computation time ($N_{CSI}$) in the second UE processing time is associate with at least a UE capability. In one example, some or all of the $N_{CSI}$ are the value reported by UE capability. In some embodiments, the UE capability is beamReportTiming in the second UE processing time.

In some embodiments, CSI computation time ($N_{CSI}$) in the second UE processing time is associated with at least a report quantity. Report quantity is CSI-related quantities to be reported by the UE such as the layer indicator (LI), L1-Reference signal received power (RSRP), L1-Signal to Interference plus Noise Ratio (SINR), CSI-RS resource indicator (CRI), and SSBRI (Synchronization Signal Block Resource Indicator).

In some embodiments, some or all $N_{CSI}$ in the second UE processing time for different report quantity are the same value. In one example, some or all $N_{CSI}$ in the second UE processing time for reporting L1-RSRP and L1-SINR are the same. In another example, some or all $N_{CSI}$ in the second UE processing time for reporting CRI and SSBRI are the same.

In some embodiments, CSI computation time ($N_{CSI}$) in the second UE processing time is associated with at least a high layer signaling. In one example, different values configured by the high layer signaling will be associated with a different CSI computation time. In another example, if the high layer signaling is configured, CSI computation time is a first value; otherwise, CSI computation time is a second value. In another example, CSI computation time is configured by the high layer signaling.

In some embodiments, CSI computation time ($N_{CSI}$) in the second UE processing time is associated with at least an index of the report. If a DCI triggers a CSI report(s) on PUSCH, one or more CSI report(s) will be transmitted. Since the UE should decode the DCI and prepare the CSI report before the first CSI report is transmitted, the $N_{CSI}$ for the first (or index 1) CSI report is larger than the other $N_{CSI}$.

For example, for the CSI report triggered by same DCI, the $N_{CSI}$ for the first CSI report is the same as the $N_{CSI}$ for the other CSI report added with C1. In some embodiments, C1 is a real number greater than 0. For example, C1 is PDCCH decoding time in the second UE processing time.

In some embodiments, CSI computation time ($N_{CSI}$) in the second UE processing time is associated with at least a frequency granularity. In one example, CSI computation time ($N_{CSI}$) in the second UE processing time for wideband frequency granularity is less than or equal to the CSI computation time ($N_{CSI}$) in the second UE processing time for sub-band frequency granularity.

In some embodiments, CSI computation time ($N_{CSI}$) in the second UE processing time is associated with SCS. In one example, $N_{CSI}=d_\mu \cdot C2$, wherein C2 is a real number and greater than 0 and less than 100 and $d_\mu$ is an integer associate with SCS and greater than 0.

In some embodiments, CSI computation time ($N_{CSI}$) in the second UE processing time is associated with at least a number of supported simultaneous CSI calculations $N_{CPU}$. In one example, a larger one of the $N_{CPU}$ is not associate with a smaller one of the $N_{CSI}$. In another example, if the $N_{CPU}$ is less than a threshold, the $N_{CSI}$ is value 1, otherwise, the $N_{CSI}$ value is 2.

Next, PDCCH decoding time in the second UE processing time is described in accordance with various embodiments.

PDCCH decoding time in the second UE processing time is associated with at least one of: SCS, control resource set (CORESET), search space set, DCI format, Radio Network Temporary Identifier (RNTI), UE capability, a predefined value, a high layer signaling, or UE type.

In some embodiments, PDCCH decoding time ($N_{PDCCH}$) is associated with SCS. In one example, a larger SCS will not be associate with a smaller PDCCH decoding time. In another example, $N_{PDCCH}=y_\mu \cdot C3$, wherein C3 is a positive real number and less than 20 and $y_\mu$ is a positive real number associated with a SCS and less than 10 (see Table 9 below).

TABLE 9

| μ | PDCCH decoding time |
|---|---|
| 0 | $y_0 \cdot C3$ |
| 1 | $y_1 \cdot C3$ |

TABLE 9-continued

| μ | PDCCH decoding time |
|---|---|
| 2 | $y_2 \cdot C3$ |
| 3 | $y_3 \cdot C3$ |

In some embodiments, PDCCH decoding time in the second UE processing time is at least associated with a UE capability. For example, the UE may report a PDCCH decoding time UE capability and the PDCCH decoding time is determined based on the reported UE capability value.

In some embodiments, PDCCH decoding time in the second UE processing time is associated with a predefined value. In some embodiments, the predefined value is different for different SCSs.

In some embodiments, PDCCH decoding time in the second UE processing time is associated with a high layer signaling. For example, PDCCH decoding time in the second UE processing time is configured by the high layer signaling.

Next, in accordance with various embodiments, the first condition is defined.

The First condition includes at least one of the following: a high layer signaling, a UE capability, UE type, a DCI, a RNTI, a BWP (Bandwidth Part), a TBS, a modulation order, CORESET, Search space set, a UE category, or random access preamble (at least one of the sequence or resource or format).

In some embodiments, the first condition includes a UE capability.

The UE capability includes at least one of the following:
1. A PDSCH-processingType Capability In some embodiments, if UE reports a UE capability that indicates the UE support PDSCH processing time in the second UE processing time, the PDSCH processing time in the second UE processing time will be used.

In the present disclosure, "will be used" may be equal to "is used".

In some embodiments, if UE not reports a UE capability that indicates the UE support PDSCH processing time in the second UE processing time, the PDSCH processing time in the first or third UE processing time will be used.

In some embodiments, the UE capability that indicates that the UE supports PDSCH processing time in the second UE processing time includes a parameter that indicates whether the UE supports second UE processing time for 1, 2, 4 and/or 7 unicast PDSCHs for different transport blocks per slot per CC.

In some embodiments, the UE may include at least one of numberOfCarriers for 1, 2, 4 or 7 transport blocks per slot in this field if this capability is indicated.
2. A pusch-processingType Capability In some embodiments, if UE reports a UE capability that indicates the UE supports PUSCH preparation time in the second UE processing time, the PUSCH preparation time in the second UE processing time will be used.

In some embodiments, if UE does not report a UE capability that indicates the UE supports PUSCH preparation time in the second UE processing time, the PUSCH preparation time in the first or third UE processing time will be used.

In some embodiments, the UE capability that indicates that the UE supports PUSCH preparation time in the second UE processing time includes a parameter that indicates whether the UE supports second UE processing time for 1, 2, 4 and/or 7 unicast PUSCHs for different transport blocks per slot per component carrier (CC). In some embodiments, the UE may include at least one of numberOfCarriers for 1, 2, 4 or 7 transport blocks per slot in this field if this capability is indicated.

3. A PDCCH Decoding Capability

In some embodiments, if UE reports a UE capability that indicates the UE supports PDCCH decoding time in the second UE processing time, the second UE processing time will be used.

In some embodiments, if UE does not report a UE capability that indicates the UE supports PDCCH decoding time in the second UE processing time, the first or third UE processing time will be used.

In some embodiments, the UE capability that indicates the UE supports PDCCH decoding time in the second UE processing time is associated with the capability which indicates the UE supports a capability of PUSCH preparation time in the second UE processing time.

4. A Second UE Processing Time Capability

In some embodiments, if UE reports a UE capability that indicates the UE supports second UE processing time, the second UE processing time will be used.

In some embodiments, if UE does not report a UE capability that indicates the UE supports second UE processing time, the first or third UE processing time will be used.

5. The Maximum Bandwidth

In some embodiments, if UE reports the maximum downlink (DL) channel bandwidth supported for a given SCS is greater than a first threshold, the first or third UE processing time will be used.

In some embodiments, if UE reports the maximum DL channel bandwidth supported for a given SCS is not greater than a first threshold, the second UE processing time will be used.

In some embodiments, the first threshold may be a positive number and not larger than 100, the unit is MHz. The first threshold may be associated with a SCS or FR type. For example, for SCS is 15 kHz or 30 kHz, the first threshold is 20 MHz, for SCS is 60 kHz or 120 kHz, the first threshold is 50 MHz. In another example, for FR 1, the first threshold is 20 MHz, for FR 2, the first threshold is 50 MHz.

6. The Number of PDCCH Candidates

In some embodiments, if UE does not report the maximum number of monitored PDCCH candidates per slot for a UE in a DL bandwidth part (BWP) or reports the maximum number of monitored PDCCH candidates per slot for a UE in a DL BWP is larger than a second threshold, the first or third UE processing time will be used.

In some embodiments, if UE reports the maximum number of monitored PDCCH candidates per slot for a UE in a DL BWP is not larger than a second threshold, the second UE processing time will be used.

In some embodiments, the second threshold may be a positive number and not larger than 100. The second threshold may be associated with a SCS or FR type. In some embodiments, a larger SCS will associate with a same or smaller second threshold. For example, a second threshold for a BWP with SCS 15 kHz is larger than or equal to a second threshold for a BWP with SCS 30 kHz. In some embodiments, second threshold for FR2 is less than the second threshold for FR1. For example, second threshold for FR2 is 10 and second threshold for FR1 is 20.

In some embodiments, if the number of PDCCH candidates is larger than a second threshold, the first or third UE processing time will be applied.

In some embodiments, if the number of PDCCH candidates is not larger than a second threshold, the second UE processing time will be applied.

7. The Number of CCEs

In some embodiments, if UE does not report the maximum number of non-overlapped control channel element (CCEs) per slot for a DL BWP or reports that the maximum number of non-overlapped CCEs per slot for a DL BWP is larger than a third threshold, the first or third UE processing time will be used.

In some embodiments, if UE reports that the maximum number of non-overlapped CCEs per slot for a DL BWP is not larger than a third threshold, the second UE processing time will be used.

In some embodiments, if the number of non-overlapped CCEs per slot for a DL BWP is larger than a third threshold, the first or third UE processing time will be used.

In some embodiments, if the number of non-overlapped CCEs per slot for a DL BWP is not larger than a third threshold, the second UE processing time will be used.

In some embodiments, the third threshold may be a positive number and is less than 100. The third threshold may be associated with a SCS or a FR type. In some embodiments, the third threshold is associated with a SCS. For example, a larger SCS will associate with a same or smaller second threshold. For example, a third threshold for a BWP with SCS 15 kHz is larger than or equal to a third threshold for a BWP with SCS 30 kHz. In some embodiments, the third threshold for FR2 is less than the third threshold for FR1. For example, the third threshold for FR2 is 20 and third threshold for FR1 is 30.

8. DCI Format Size

In some embodiments, if UE reports a total number of different DCI sizes configured to monitor for a cell is less than a fourth threshold, the second UE processing time will be applied (or used). Otherwise, the first or third UE processing time will be used.

In some embodiments, if the total number of different DCI sizes configured to monitor for a cell is less than a fourth threshold, the second UE processing time will be applied (or used). Otherwise, the first or third UE processing time will be used.

In some embodiments, the fourth threshold may be a positive number and may be less than 5. For example, the fourth threshold may be 4. In some embodiments, the fourth threshold may be associate with a SCS, a FR type, a RNTI or a link direction.

9. The Maximum Modulation Order

In some embodiments, if UE does not report the maximum modulation order or report the maximum modulation order greater than a fifth threshold, the first or third UE processing time will be used.

In some embodiments, if UE reports the maximum modulation order that is not greater than a fifth threshold, the second UE processing time will be used.

In some embodiments, if the maximum modulation order is greater than a fifth threshold, the first or third UE processing time will be used at least for the transport block (TB).

In some embodiments, if the maximum modulation order is not greater than a fifth threshold, the second UE processing time will be used at least for the transport block.

In some embodiments, the fifth threshold may be a positive number and may be less than 8. For example, the fifth threshold may be 6. In some embodiments, the fifth threshold may be associate with a SCS, a FR type, a RNTI, a DCI format or a link direction.

In some embodiments, the maximum modulation order is the maximum modulation order for PDSCH reception or the maximum modulation order for PUSCH transmission.

10. The Number of CORESET

In some embodiments, if the maximum number of CORESET for a BWP is not greater than a sixth threshold, the second UE processing time will be used.

In some embodiments, if the maximum number of CORESET for a BWP is greater than a sixth threshold, the first or third UE processing time will be used.

In some embodiments, the sixth threshold may be a positive number and may be less than 4. For example, the sixth threshold may be 2. In some embodiments, the sixth threshold may be associate with a SCS or a bandwidth.

11. The Number of Search Space Set

In some embodiments, if the maximum number of search space set for a BWP is not greater than a seventh threshold, the second UE processing time will be used.

In some embodiments, if the maximum number of search space set for a BWP is greater than a seventh threshold, the first or third UE processing time will be used.

In some embodiments, the seventh threshold may be a positive number and less than 10. For example, the seventh threshold may be 6. In some embodiments, the seventh threshold is associated with a SCS or a bandwidth.

12. A Reduced Capability

In some embodiments, if UE reports support of a reduced capability, the second UE processing time will be used.

In some embodiments, if UE does not report support of a reduced capability or reports not to support a reduced capability, the first or third UE processing time will be used.

In some embodiments, UE reports support of a reduced capability means the UE is a reduced capability UE.

In some embodiments, first condition includes a high layer signaling.

In some embodiments, high layer signaling (or parameter) is a second UE processing time enable signaling.

In some embodiments, if the high layer signaling is configured and/or set to enable, the second UE processing time is used. Otherwise, if a second high layer signaling processingType2Enabled is configured and set to enabled, the third UE processing time is used and if the second high layer signaling is not configured or not set to enabled, the first UE processing time is used.

In some embodiments, a high layer signaling is configured and used to enable a specific second UE processing time. For example, the specific second UE processing time is a PUSCH preparation procedure time in the second UE processing time, if the high layer signaling is configured, the PUSCH preparation procedure time in second UE processing time is used.

In some embodiments, if a high layer signaling is configured and set to a first state, the second UE processing time will be used. If a high layer signaling is configured and set to a second state, the third UE processing time will be used. If a high layer signaling is not configured or set to a third state, the first UE processing time will be used.

In some embodiments, a high layer signaling is used to indicate to enable at least one kind of the second UE processing time. The kind of the second UE processing time which is enabled is indicated in the high layer signaling.

For example, a fist high layer signaling includes several second kind high layer parameters. Each second kind of high layer parameter indicates whether to enable a time in the second UE processing time.

As an example, in accordance with an embodiment:
A first high layer signaling {
N1 in second UE processing time enable signal: enable
N2 in second UE processing time enable signal: enable
PDCCH decoding time in second UE processing time enable signal: disable
. . .
}

In some embodiments, the first condition includes a UE capability and a high layer signaling.

In some embodiments, if UE reports support of a second UE processing time and a first high layer signaling indicates "enable" of the second UE processing time, the second UE processing time is used. Otherwise, if UE reports support of a third UE processing time and a second high layer signaling indicates "enable" of the third UE processing time, the third UE processing time is used. If UE does not report support of a third UE processing time and a second high layer signaling does not indicate "enable" of the third UE processing time, the first UE processing time is used.

In some embodiments, if UE reports support of a second UE processing time and a first high layer signaling indicates "enable" of the second UE processing time, the second UE processing time is used. Otherwise, a first or third UE processing time is used.

In some embodiments, the first condition includes random access preamble (at least one of the sequence, resource or format).

In some embodiments, if a predefined sequence/resource/format is used for random access, the first or third UE processing time is used, wherein the predefined sequence/resource/format is for random access preamble, random access response (RAR), PUSCH scheduled by RAR or PDSCH for contention resolution.

In some embodiments, if a predefined sequence/resource/format is not used for random access, the characteristic of the PDCCH candidates fulfills the second or third PDCCH monitoring requirement.

In some embodiments, if a UE supports transmission of a specific random access preamble (Msg 1) or transmission of a specific PUSCH (Msg 3) scheduled by a RAR uplink (UL) grant, the second UE processing time will be used.

In some embodiments, the specific random access preamble is a random access preamble associated with reduced capability information. In some embodiments, the specific PUSCH is a PUSCH carrying the reduced capability information.

In some embodiments, if a UE receives a specific RAR message with a PDCCH/PDSCH (Msg2) or a specific PDSCH (Msg4) for contention resolution, the second UE processing time will be used.

In some embodiments, the specific Msg2 is a Msg2 associated with a reduced capability information. The specific Msg4 is a Msg4 associated with a reduced capability information.

In some embodiments, if a UE supports transmission of a specific random access preamble in a PRACH and of a specific PUSCH (MsgA) or receives a specific RAR message with a PDCCH/PDSCH (MsgB), the second UE processing time will be used, wherein when MsgB is applicable, transmission of a PUSCH scheduled by a RAR UL grant and PDSCH for contention resolution is included.

In some embodiments, the specific MsgA is MsgA associated with a reduced capability information. The specific MsgB is a MsgB associated with a reduced capability information.

In some embodiments, if the UE supports a specific L1 random access procedure, the second UE processing time will be used, wherein the specific L1 random access procedure is associated with a reduced capability information. Otherwise, the first or third UE processing time will be used.

In some embodiments, the first condition includes DCI.

In some embodiments, the first condition includes DCI and the modulation order. In some embodiments, if UE receives a DCI scheduling a PDSCH and indicates a modulation order that is greater than an eighth threshold, at least the N1 in the first or third UE processing time will be used at least for the PDSCH. If UE receives a DCI scheduling a PDSCH and indicates a modulation order that is not greater than an eighth threshold, at least the N1 in the second UE processing time will be used at least for the PDSCH. The eighth threshold may be a positive number and less than 8. For example, the eighth threshold may be 5.

In some embodiments, the UE may determine the modulation order according to the 5-bit modulation and coding scheme field in the DCI.

In some embodiments, if UE receives a DCI scheduling a PUSCH and indicates a modulation order that is greater than a tenth threshold, at least the N2 in the first or third UE processing time will be used at least for the PUSCH. If UE receives a DCI scheduling a PUSCH and indicates a modulation order that is not greater than tenth threshold, at least the N2 in the second UE processing time will be used at least for the PUSCH. The tenth threshold may be a positive number and less than 6. For example, the tenth threshold may be 4.

In some embodiments, if the total number of different DCI sizes configured to monitor for a cell is greater than a twelfth threshold, a first or third UE processing time will be used for the cell.

In some embodiments, if the total number of different DCI sizes configured to monitor for a cell is not greater than a twelfth threshold, a second UE processing time will be used for the cell.

In some embodiments, if UE monitors a specific DCI format, a second UE processing time will be used. The specific DCI format is a DCI format associated with a reduced capability.

In some embodiments, the first condition includes a TBS.

In some embodiments, if UE receives a DCI scheduling a PDSCH or receives a PDSCH without a DCI and the transport block size (TBS) is greater than a ninth threshold, at least the N1 in the first UE processing time is used at least for the PDSCH. In some embodiments, if UE receives a DCI scheduling a PDSCH and the TBS is not greater than a ninth threshold, at least the N1 in the second UE processing time will be used at least for the PDSCH. The ninth threshold may be a positive number and less than 10000. For example, the ninth threshold may be 1024.

In some embodiments, if UE prepares to transmit a PUSCH indicated by a DCI or scheduled by a DCI activating a configured grant Type 2 PUSCH or scheduled by a configured grant Type 1 PUSCH, and the TBS is greater than an eleventh threshold, at least the N2 in the first or third UE processing time is used for the PUSCH. In some embodiments, if UE prepares to transmit a PUSCH indicated by a DCI or scheduled by a DCI activating a configured grant Type 2 PUSCH or scheduled by a configured grant Type 1 PUSCH, and the TBS is not greater than an eleventh threshold, at least the N2 in the second UE processing time is used for the PUSCH. The eleventh threshold may be a positive number and less than 10000. For example, the eleventh threshold may be 1024.

In some embodiments, if UE prepares to transmit a PUSCH indicated by a DCI or scheduled by a DCI activating a configured grant Type 2 PUSCH or scheduled by a configured grant Type 1 PUSCH, at least the N2 in the second UE processing time is used.

In some embodiments, the first condition includes CORESET.

In some embodiments, if the number of CORESET configured in a BWP is greater than a sixth threshold, a first or third UE processing time will be used for the BWP.

In some embodiments, if the number of CORESET configured in a BWP is not greater than a sixth threshold, a second UE processing time will be used for the BWP.

In some embodiments, the sixth threshold may a positive number and may be less than 4. For example, the sixth threshold may be 2. In some embodiments, the sixth threshold may be associated with a SCS or a bandwidth.

In some embodiments, if a DCI scheduled a PDSCH or PUSCH is associated with a specific CORESET, at least an N1 or N2 in the second UE processing time is used for the PDSCH or PUSCH. In some embodiments, the specific CORESET may be a CORESET associate with a reduced capability information.

In some embodiments, the first condition includes a search space set.

In some embodiments, if the number of search space set configured for a BWP is not greater than a seventh threshold, the second UE processing time will be used.

In some embodiments, if the number of search space set configured for a BWP is greater than a seventh threshold, the first or third UE processing time will be used.

The seventh threshold may be a positive number and less than 10. For example, the seventh threshold may be 6. In some embodiments, the seventh threshold may be associate with a SCS or a bandwidth.

In some embodiments, if a DCI scheduled a PDSCH or PUSCH is associated with a specific search space set, at least an N1 or N2 in the second UE processing time is used for the PDSCH or PUSCH. In some embodiments, the specific search space set may be a search space set associate with a reduced capability information.

In some embodiments, the first condition includes a BWP.

In some embodiments, if the bandwidth is greater than a first threshold, the first or third UE processing time will be used in the BWP.

In some embodiments, if the bandwidth is not greater than a first threshold, the second UE processing time will be used in the BWP.

The first threshold may be a positive number and not larger than 100, the unit is MHz. The first threshold may be associated with a SCS or FR type. For example, for SCS being 15 kHz or 30 kHz, the first threshold is 20 MHz, for SCS being 60 kHz or 120 kHz, the first threshold is 50 MHz. In another example, for FR 1, the first threshold is 20 MHz, for FR 2, the first threshold is 50 MHz.

In some embodiments, if the active BWP is a specific BWP, a second UE processing time will be used in the BWP. The specific BWP is a BWP associated with a reduced capability information.

Next, some combination examples are described in accordance with various embodiments.

In some embodiments, the first condition includes (e.g. associated with) UE capability and a number of CORESET. For example, if UE reports a UE capability supporting the second UE processing time, and the number of CORESET configured for a BWP or serving cell is not greater than a sixth threshold, a second UE processing time will be used in the BWP or serving cell. Otherwise, a first or third UE processing time will be used in the BWP or serving cell.

In some embodiments, the first condition includes UE capability and a number of search space set. For example, if UE reports a UE capability supporting the second UE processing time, and the number of search space set configured for a BWP or serving cell is not greater than a seventh threshold, a second UE processing time will be used in the BWP or serving cell. Otherwise, a first or third UE processing time will be used in the BWP or serving cell.

In some embodiments, the first condition includes UE capability and a number of DCI size. For example, if UE reports a UE capability supporting the second UE processing time, and the total number of different DCI sizes configured to monitor for a cell is not greater than a twelfth threshold, a second UE processing time will be used for the cell. Otherwise, a first or third UE processing time will be used for the cell.

In some embodiments, the first condition includes UE capability and a bandwidth. For example, if UE reports a UE capability supporting the second UE processing time, and the bandwidth is not greater than a first threshold, the second UE processing time will be used in the BWP. Otherwise, a first or third UE processing time will be used in the BWP.

In some embodiments, the first condition includes a UE capability and a TBS. For example, if UE reports a UE capability supporting the second UE processing time, and receives a DCI scheduling a PDSCH or a PDSCH to be received without a DCI and the transport block size (TBS) is not greater than a ninth threshold, at least the N1 in second UE processing time is used for the PDSCH. In another example, if UE reports a UE capability supporting the second UE processing time, and UE prepares to transmit a PUSCH indicated by a DCI or scheduled by a DCI activating a configured grant Type 2 PUSCH or scheduled by a configured grant Type 1 PUSCH, and the TBS is not greater than an eleventh threshold, at least the N2 in the second UE processing time is used for the PUSCH.

In some embodiments, the first condition includes a UE capability and a modulation order. For example, if UE reports a UE capability supporting the second UE processing time, and UE receives a DCI schedule a PDSCH and indicates a modulation order is not greater than an eighth threshold, at least the N1 in the second UE processing time will be used for the PDSCH. In another example, if UE reports a UE capability supporting the second UE processing time, and UE receives a DCI scheduling a PUSCH and indicates a modulation order is not greater than a tenth threshold, at least the N2 in second UE processing time will be used for the PUSCH.

In some embodiments, the first condition includes UE capability and a high layer signaling and a bandwidth. For example, if UE reports a UE capability supporting the second UE processing time, and a high layer signaling configured to enable a second UE processing time, and the bandwidth is not greater than a first threshold, the second UE processing time will be used in the BWP. Otherwise, a first or third UE processing time will be used in the BWP.

In some embodiments, the first condition includes UE capability and a high layer signaling and the number of CORESET. For example, if UE reports a UE capability supporting the second UE processing time, and a high layer signaling configured to enable a second UE processing time, and the number of CORESET configured for a BWP or serving cell is not greater than a sixth threshold, the second UE processing time will be used in the BWP or serving cell. Otherwise, a first or third UE processing time will be used in the BWP or serving cell.

In some embodiments, the first condition includes UE capability and a high layer signaling and a number of search space set. For example, if UE reports a UE capability supporting the second UE processing time, and a high layer signaling configured to enable a second UE processing time, and the number of search space set configured for a BWP or serving cell is not greater than a seventh threshold, the second UE processing time will be used in the BWP or serving cell. Otherwise, a first or third UE processing time will be used in the BWP or serving cell.

In some embodiments, the first condition includes UE capability and a high layer signaling and the number of DCI size. For example, if UE reports a UE capability supporting the second UE processing time, and a high layer signaling configured to enable a second UE processing time, and the total number of different DCI sizes configured to monitor for a cell is not greater than a twelfth threshold, the second UE processing time will be used for the cell. Otherwise, a first or third UE processing time will be used for the cell.

In some embodiments, the first condition includes a high layer signaling and a DCI format. For example, if a high layer signaling configured to enable a second UE processing time, and UE monitors a specific DCI format, a second UE processing time will be used.

In some embodiments, the first condition includes a high layer signaling and a CORESET. For example, if a high layer signaling configured to enable a second UE processing time, and a DCI scheduled a PDSCH or PUSCH is associated with a specific CORESET, at least an N1 or N2 in the second UE processing time is used for the PDSCH or PUSCH. In some embodiments, the specific CORESET may be a CORESET associate with a reduced capability information.

In some embodiments, the first condition includes a high layer signaling and a search space set. For example, if a high layer signaling configured to enable a second UE processing time, and a DCI scheduled a PDSCH or PUSCH is associated with a specific search space set, at least an N1 or N2 in the second UE processing time is used for the PDSCH or PUSCH. In some embodiments, the specific search space set may be a search space set associate with a reduced capability information.

In some embodiments, the first condition includes a high layer signaling and a BWP. For example, if a high layer signaling configured to enable a second UE processing time, and the active BWP is a specific BWP, a second UE processing time will be used in the BWP. The specific BWP may be a BWP associate with a reduced capability information.

In some embodiments, the first condition includes a UE type and a high layer signaling. If UE is a reduced capability UE and a high layer signaling configured to enable a second UE processing time, a second UE processing time will be used. Otherwise, a first or third UE processing time will be used.

In some embodiments, the first condition includes a UE type and a UE capability. If UE is a reduced capability UE and reports a capability of supporting the second UE processing time, a second UE processing time will be used. Otherwise, a first or third UE processing time will be used.

Next, UE categories in accordance with various embodiments are described.

For a first UE category, second kind UE processing time will be applied (or used).

For a second UE category, first or third kind UE processing time will be applied (or used).

In some embodiments, the UE category is determined by a predefined UE capability. In some embodiments, the predefined UE capability includes at least one of the following:

Supported bandwidth

Number of receiving antennas or transmitting antennas

Maximum MIMO layer or maximum rank or number of ports

Maximum number of HARQ process

Maximum modulation order. In some embodiments, the maximum modulation order can be a modulation order for UL or DL.

Maximum code rate

Maximum number of CORSET per DL BWP or serving cell

Maximum number of search space sets per DL BWP or serving cell

Maximum number of monitored PDCCH candidates within a span

Maximum number of non-overlapped CCE within a span

Maximum number of DCI sizes

Maximum number of the monitored PDCCH candidates within a resource unit

Maximum number of non-overlapped CCE within a resource unit

Maximum number of bits received within a period. In some embodiments, the period can be one of TTI (transmission time interval), slot, millisecond, second. In some embodiments, the bits are the DL-SCH transport block bits.

Maximum number of bits of a transport block received within a period. In some embodiments, the period can be one of TTI (transmission time interval), slot, millisecond, second. In some embodiments, the transport block is a DL-SCH transport block.

Maximum number of transport blocks received within a period. In some embodiments, the period can be one of TTI (transmission time interval), slot, millisecond, second. In some embodiments, the transport block is a DL-SCH transport block.

Maximum number of bits transmitted within a period. In some embodiments, the period can be one of TTI (transmission time interval), slot, millisecond, second. In some embodiments, the bits are the UL-SCH transport block bits.

Maximum number of bits of a transport block transmitted within a period. In some embodiments, the period can be one of TTI (transmission time interval), slot, millisecond, second. In some embodiments, the transport block is a UL-SCH transport block.

Maximum number of transport blocks transmitted within a period. In some embodiments, the period can be one of TTI (transmission time interval), slot, millisecond, second. In some embodiments, the transport block is a UL-SCH transport block.

Maximum data rate. In some embodiments, the maximum date rate is one of the maximum data rate of PUSCH transmission in a serving cell or serving cell group, or the maximum data rate of PDSCH reception in a serving cell or serving cell group.

Total number of soft channel bits. In some embodiments, the total number of soft channel bits is the total number of soft channel bits available for HARQ processing.

Buffer size. In some embodiments, the buffer size is the total layer 2 buffer size. In some embodiments, the total layer 2 buffer size is defined as the sum of the number of bytes that the UE is capable of storing in the RLC transmission windows and RLC reception and reordering windows and also in PDCP reordering windows for all radio bearers.

TDD/FDD operation. In some embodiments, the TDD/FDD operation includes TDD operation, FDD operation or half-duplex FDD operation. In some embodiments, the half-duplex FDD operation includes at least one of type A half-duplex FDD operation or type B half-duplex FDD operation.

A maximum number of repetition times of a physical channel/signal

In some embodiments, the UE category is determined by UE capability including at least supported bandwidth and number of receiving antennas.

In some embodiments, the UE category is determined by UE capability including at least supported bandwidth and number of transmitting antennas.

In some embodiments, the UE category is determined by UE capability including at least supported bandwidth, number of transmitting antennas, and number of receiving antennas.

In some embodiments, the UE category is determined by UE capability including at least supported bandwidth, and number of HARQ process.

In some embodiments, the UE category is determined by UE capability including at least supported bandwidth, number of transmitting antennas, and maximum number of HARQ process.

In some embodiments, the UE category is determined by UE capability including at least supported bandwidth, number of receiving antennas, and maximum number of monitored PDCCH candidates within a span.

In some embodiments, the UE category is determined by UE capability including at least supported bandwidth, maximum MIMO layer, and maximum modulation order.

In some embodiments, the UE category is determined by UE capability including at least supported bandwidth, maximum MIMO layer, maximum modulation order, and maximum code rate.

In some embodiments, the UE category is determined by UE capability including at least supported bandwidth, maximum MIMO layer, maximum modulation order, maximum code rate, and maximum data rate.

In some embodiments, the UE category is determined by UE capability including at least supported bandwidth, maximum data rate and buffer size.

In some embodiments, the UE category is determined by UE capability including at least supported bandwidth, number of receiving antennas, maximum modulation order, and supported half-duplex FDD operation type.

In some embodiments, the UE category is determined by UE capability including at least supported bandwidth, number of receiving antennas, and maximum modulation order.

In some embodiments, the UE category is determined by UE capability including at least supported bandwidth, maximum data rate, and supported half-duplex FDD operation type.

In some embodiments, the UE category is determined by UE capability including at least supported bandwidth, maximum data rate, and maximum modulation order.

In some embodiments, the UE category is determined by UE capability including at least supported bandwidth, maximum data rate, maximum modulation order, and maximum number of MIMO layer.

In some embodiments, the UE category is determined by UE capability including at least supported bandwidth, maximum data rate, maximum modulation order, maximum number of MIMO layer, and supported half-duplex FDD operation type.

In some embodiments, the UE category is determined by UE capability including at least supported bandwidth, maximum number of MIMO layer, and supported half-duplex FDD operation type.

In some embodiments, the UE category is determined by UE capability including at least maximum number of bits received within a period, maximum number of bits of a transport block received within a period, maximum modulation order, and total number of soft channel bits.

In some embodiments, the UE category is determined by UE capability including at least maximum number of bits transmitted within a period, maximum number of bits of a transport block transmitted within a period, and maximum modulation order.

In some embodiments, the first UE category is a UE with reduced/low capability, or NR light UE or UE with limited bandwidth or UE with coverage enhancement.

In some embodiments, the first UE category includes at least one of the following capabilities:

Maximum bandwidth is not larger than a first threshold

The number of receiving antenna is not larger than a second threshold

The number of transmission antenna is not larger than a third threshold

The maximum number of MIMO layer is not larger than a fourth threshold

The maximum number of ports is not larger than a fifth threshold

The maximum number of rank is not larger than a sixth threshold

Supports HD-FDD

Maximum number of the monitored PDCCH candidates within a resource unit is not larger than a twentieth threshold The maximum number of non-overlapped CCE within a resource unit is not larger than a twenty first threshold The maximum modulation order is not larger than a seventh threshold The maximum number of DCI sizes is not larger than an eighth threshold Maximum number of search space sets per DL BWP or serving cell is not larger than a ninth threshold The maximum number of CORESET per DL BWP or serving cell is not larger than a tenth threshold The maximum data rate is not larger than an eleventh threshold The maximum number of HARQ process is not larger than a twelfth threshold The maximum code rate is not larger than a thirteenth threshold The maximum number of bits received within a period is not larger than a fourteenth threshold The maximum number of bits of a transport block received within a period is not larger than a fifteenth threshold The maximum number of bits transmitted within a period is not larger than a sixteenth threshold The maximum number of bits of a transport block transmitted within a period is not larger than an eighteenth threshold The maximum number of bits of a buffer size is not larger than a nineteenth threshold.

The threshold above may be a positive integer.

In some embodiments, the first UE category includes at least one of the following capability:

Supported bandwidth is 20 MHz

One or two receiving antennas. In some embodiments, the number of receiving antenna is determined by the frequency range or subcarrier spacing. For example, for frequency range 1, the number of receiving antenna is 1. For example, for frequency range 1, the number of receiving antenna is 2.

Maximum MIMO layer is 4

Maximum modulation order is 4

Supported half-duplex FDD operation type.

Next, other settings are described in accordance with various embodiment, wherein if a second UE processing time is used or conditions for the second UE processing time are satisfied.

In some embodiments, N1 in the second UE processing time is used when at least one of the following is satisfied: a high layer signaling to enable N1 in the second UE processing time, and a second UE processing time capability is configured.

In some embodiments, if N1 in the second kind UE processing time is used (or applied), an associated time may be determined associated with the second kind UE processing time.

The associated time includes at least one of the following:
1. the minimum time between a last symbol of a PDSCH corresponding to SI-RNTI and a starting symbol of a re-transmission of an earlier PDSCH;
2. a time duration from the last symbol of a PDCCH to the first symbol of a HARQ-ACK information;
3. a time duration between the last symbol of a second DCI which indicates a second resource of PUCCH and the first symbol of the PUCCH resource which is indicated by a first DCI and UE is expected to multiplex HARQ-ACK information corresponding to the second DCI format in a time duration in PRACH procedure.

In some embodiments, in a given scheduled cell, for any PDSCH corresponding to SI (System Information)-RNTI (Radio Network Temporary Identifier), the UE is not expected to decode a re-transmission of an earlier PDSCH with a starting symbol less than N symbols after the last symbol of that PDSCH, wherein the value of N depends on the PDSCH subcarrier spacing configuration $\mu$ and an N1 processing time. For example, if an N1 in first or third UE processing time is used, N=13 for $\mu$=0, N=13 for $\mu$=1, N=20 for $\mu$=2, and N=24 for $\mu$=3. If an N1 in the second UE processing time is used, the value of N is incremented by X1, wherein, X1 is a positive number and less than 20. For example, X1=3. In another example, X1 is associated with SCS.

In some embodiments, the time duration from the last symbol of a PDCCH to the first symbol of a HARQ-ACK information is N symbols. The value of N is associated with a SCS and a high layer signaling. If processingType2Enabled of PDSCH-ServingCellConfig is set to enable for the serving cell with the PDCCH, N=5 for $\mu$=0, N=5.5 for $\mu$=1, N=11 for $\mu$=2. If a high layer signaling to enable a second UE processing time is set to enable for the serving cell with the PDCCH, N=10+X2 for $\mu$=0, N=12+X3 for $\mu$=1, N=22+X4 for $\mu$=2, and N=25+X5 for $\mu$=3. Otherwise, N=10 for $\mu$=0, N=12 for $\mu$=1, N=22 for $\mu$=2, and N=25 for $\mu$=3, wherein $\mu$ corresponds to the smallest SCS configuration between the SCS configuration of the PDCCH and the SCS configuration of a PUCCH carrying the HARQ-ACK information.

In some embodiments, the time duration from the last symbol of a PDCCH to the first symbol of a HARQ-ACK information is N symbols. The value of N is associated with a SCS and a UE processing time type. For example, the N value in case of an N1 in the second UE processing time is used is larger than the N value in case of an N1 in the first or third UE processing time.

The PDCCH is at least one of the following: a PDCCH providing a SPS PDSCH release, a PDCCH providing a DCI format 1_1 which indicates s Secondary cell (SCell) dormancy. The HARQ-ACK information is in response to the SPS PDSCH release or the detection of the DCI format 1_1. X2, X3, X4, X5 may be positive numbers and less than 20. For example, X2=X3=X4=X5=4.

Figure 4:
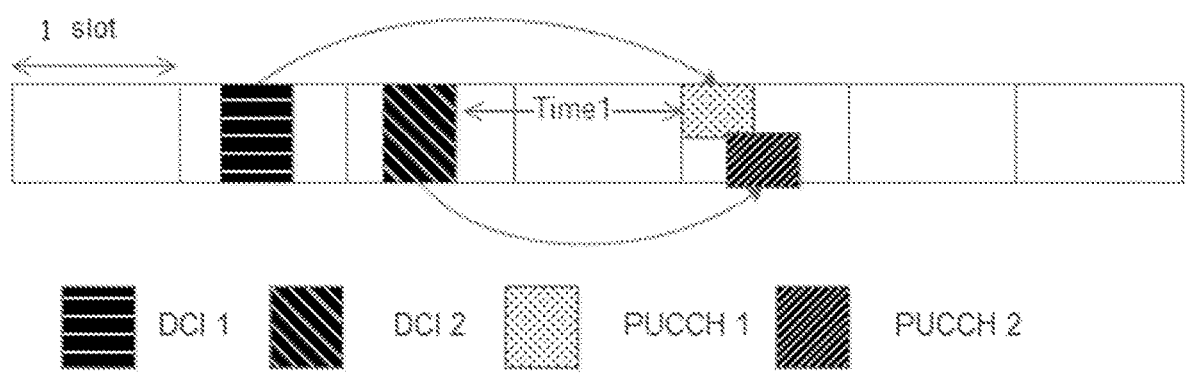
FIG. 4 illustrates a timing diagram related to downlink control information and physical uplink control channels according to an embodiment of the present disclosure.

In some embodiments, with reference to FIG. 4, if a UE detects a first DCI (DCI 1) format indicating a first resource for a PUCCH (PUCCH 1) transmission with corresponding HARQ-ACK information in a slot and also detects at a later time a second DCI (DCI 2) format indicating a second resource for a PUCCH (PUCCH 2) transmission with corresponding HARQ-ACK information in the slot, if the time duration (Time 1) is less than $N_3 \cdot (2048+144) \cdot \kappa \cdot 2^{-\mu} \cdot T_C$, the UE is not expected to multiplex HARQ-ACK information corresponding to the second DCI format in a PUCCH resource in the slot, wherein, $\kappa$ is the ratio between $T_S$ and $T_C$, $T_C$ is basic time unit for NR, $T_S$ is the basic time unit for LTE, and $\mu$ corresponds to the smallest SCS configuration among the SCS configurations of the PDCCHs providing the DCI formats and the SCS configuration of the PUCCH. $N_3$ is associated with a SCS and a UE processing time type. In some embodiments, If processingType2Enabled of PDSCH-ServingCellConfig is set to enable for the serving cell with the second DCI format and for all serving cells with corresponding HARQ-ACK information multiplexed in the PUCCH transmission in the slot, $N_3$=3 for $\mu$=0, $N_3$=4.5 for $\mu$=1, $N_3$=9 for $\mu$=2; if the second UE processing time is used, $N_3$=8+X6 for $\mu$=0, $N_3$=10+X7 for $\mu$=1, $N_3$=17+X8 for $\mu$=2, $N_3$=20+X9 for $\mu$=3, otherwise, $N_3$=8 for $\mu$=0, $N_3$=10 for $\mu$=1, $N_3$=17 for $\mu$=2, $N_3$=20 for $\mu$=3, wherein, X6, X7, X8, X9 may be positive number and less than 20. For example, X6=X7=4, X8=X9=8. In another example, X6, X7, X8, X9 are associated with SCS. In some embodiments, the $N_3$ value for the second UE processing time is greater than the $N_3$ value for the first or third UE processing time.

In some embodiments, in PRACH procedure, a time duration (Time 2) is associated with a PDSCH processing time. If the N1 in the second UE processing time is used, Time 2 is associated with N1 in the second UE processing time, otherwise, Time 2 is associated with N1 for UE processing capability 1 when additional PDSCH DM-RS is configured.

The time duration (Time 2) may be at least one of the following:

Time between the last symbol of a PDSCH reception conveying a RAR message with a RAR UL grant and the first symbol of a corresponding PUSCH transmission scheduled by the RAR UL grant;

Time between the slot in which a timing advance command received which is for a transmission other than a PUSCH scheduled by a RAR UL grant, or a PUCCH with HARQ-ACK information in response to a successRAR, and the symbol of the corresponding adjustment of the uplink transmission timing applies;

Time between the last symbol of a window, or the last symbol of the PDSCH reception and the first symbol to transmit a PRACH if a higher layer indicates the physical layer to transmit a PRACH, wherein, the window is ra-ResponseWindow or msgB-Response-Window;

Time between the last symbol of the PDSCH reception with the UE contention resolution identity and the first symbol of the corresponding PUCCH transmission with the HARQ-ACK information.

Next, at least N2 in the second UE processing time is described in accordance with various embodiments.

In some embodiments, in PRACH procedure, a time duration (Time 3) is associated with a PUSCH processing time (N2). If the N2 in the second UE processing time is used or a high layer signaling associated with N2 in the second UE processing time is set to enable, Time 3 is associated with N2 in the second UE processing time, otherwise, Time 3 is associated with N2 for UE processing capability 1.

The time duration may be at least one of the following: a time between the last symbol of the PDCCH order reception and the first symbol of the PRACH transmission if requested by higher layers; or time between the slot in which a timing advance command received which is for a transmission other than a PUSCH scheduled by a RAR UL grant, or a PUCCH with HARQ-ACK information in response to a successRAR, and the symbol for the corresponding adjustment of the uplink transmission timing applies.

In some embodiments, for single cell operation or for operation with carrier aggregation in the same frequency band, a UE does not transmit PRACH and PUSCH/PUCCH/SRS in the same slot or when a gap between the first or last symbol of a PRACH transmission in a first slot is separated by less than N symbols from the last or first symbol, respectively, of a PUSCH/PUCCH/SRS transmission in a second slot. N is associated with a SCS or a UE processing time type or a high layer signaling. In some embodiments, if N2 in the second UE processing time is used or a high layer signaling associated with N2 in the second UE processing time is set to enable, N=X10 for $\mu=0$ or $\mu=1$, N=X11 for $\mu=2$ or $\mu=3$, otherwise, where N=2 for $\mu=0$ or $\mu=1$, N=4 for $\mu=2$ or $\mu=3$, and $\mu$ is the SCS configuration for the active UL BWP, wherein X10 and X11 may be positive numbers and less than 10. In some embodiments, X10≥2, X11≥4.

Next, available value ranges for K0, K1, K2, a CSI-RS triggering offset, SRS offset, K0min, K2min for the second UE processing time are described in accordance with various embodiments.

In some embodiments, if a second UE processing time is used, a second available value range for a first kind parameter is applied, otherwise a first available value range for a first kind parameter is applied. The first kind parameter includes at least one of the following: K0, K1, K2, a CSI-RS triggering offset, SRS offset, K0min, or K2min.

In some embodiments, if a second UE processing time is used, a second available value range for K0 or K2 is applied, otherwise a first available value range for K0 or K2 is applied. A first available value range for K0 or K2 may range from 0 to 32. A second available value range for K0 or K2 may range from 0 to V1, wherein V1 may be a positive number and greater than 32 and less than 64. In some embodiments, V1 is associated with SCS.

In some embodiments, if a second UE processing time is used, a second maximum available value for K0 or K2 is applied, otherwise a first maximum available value for K0 or K2 is applied. The first maximum available value for K0 or K2 may be 32. The second maximum available value for K0 or K2 may be V1.

In some embodiments, if a second UE processing time is used, a second available value range for a CSI-RS triggering offset is applied, otherwise a first available value range for a CSI-RS triggering offset is applied. A first available value range for K0 or K2 may be {0, 1, 2, 3, 4, 5, 6, . . . , 15, 16, 24}. A second available value range for a CSI-RS triggering offset may range from 0 to V2. V2 may be a positive number and greater than 24 and less than 64. For example, V2 may be 48. In some embodiments, V2 is associated with SCS.

In some embodiments, if a second UE processing time is used, a second maximum available value for a CSI-RS triggering offset is applied, otherwise a first maximum available value for a CSI-RS triggering offset is applied. The first maximum available value for a CSI-RS triggering offset may be 24 or 32. The second maximum available value for a CSI-RS triggering offset may be V2.

In some embodiments, if a second UE processing time is used, a second available value range for K1 is applied, otherwise a first available value range for K1 is applied. A first available value range for K1 may range from 0 to 15. A second available value range for K1 may range from 0 to V3. V3 may be a positive number and greater than 16 and less than 64. In some embodiments, V3 is associated with SCS.

In some embodiments, if a second UE processing time is used, a second maximum available value for K1 is applied, otherwise a first maximum available value for K1 is applied. The first maximum available value for K1 may be 15. The second maximum available value for K1 may be V3.

In some embodiments, if a second UE processing time is used, a second available value range for SRS offset is applied, otherwise a first available value range for SRS offset is applied. A first available value range for SRS offset may range from 0 to 32. A second available value range for SRS offset may range from 0 to V4. V4 may be a positive number and greater than 32 and less than 64. In some embodiments, V4 is associated with SCS.

In some embodiments, if a second UE processing time is used, a second maximum available value for SRS offset is applied, otherwise a first maximum available value for SRS offset is applied. The first maximum available value for SRS offset may be 15. The second maximum available value for SRS offset may be V3.

In some embodiments, if a second UE processing time is used, a second available value range for K0min or K2min is applied, otherwise a first available value range for K0min or K2min is applied. A first available value range for K0min or K2min may range from 0 to 16. A second available value range for K0min or K2min may range from 0 to V5. V5 may be a positive number and greater than 16 and less than 64. In some embodiments, V5 is associated with SCS. In some embodiments, V5 is 32.

In some embodiments, if a second UE processing time is used, a second maximum available value for K0min or K2min is applied, otherwise a first maximum available value for K0min or K2min is applied. The first maximum available value for K0min or K2min may be 16. The second maximum available value for K0min or K2min may be V5.

In some embodiments, if a second UE processing time is used, a second maximum available value for UE report preferred K0min or K2min is applied, otherwise a first maximum available value for UE report preferred K0min or K2min is applied. The first maximum available value for UE report preferred K0min or K2min may be 6 for SCS 15 kHz/30 kHz and 12 for SCS 60 kHz/120 kHz. The second maximum available value for UE report preferred K0min or K2min may be V6. V6 may be a positive number greater than 6 and less than 33. In some embodiments, V6 is associated with SCS.

In the present disclosure, K0 may be a slot offset between DCI and its scheduled PDSCH.

In the present disclosure, K2 may be a slot offset between DCI and its scheduled PUSCH.

In the present disclosure, K0min may be the minimum value of K0. Minimum K0 parameter denotes minimum applicable value(s) for the time domain resource allocation (TDRA) table for PDSCH and for a CSI-RS triggering offset(s).

In the present disclosure, K2min may be the minimum value of K2. Minimum K2 parameter denotes minimum applicable value(s) for the time domain resource assignment table for PUSCH.

In the present disclosure, K1 (or d1-DataToUL-ACK) may be a slot offset between PDSCH and HARQ or a slot offset between DCI and HARQ.

In the present disclosure, aperiodic CSI-RS triggering offset may be a offset between the slot containing the DCI that triggers a set of aperiodic NZP CSI-RS resources and the slot in which the CSI-RS resource set is transmitted.

In the present disclosure, the SRS offset may be an offset in number of slots between the triggering DCI and the actual transmission of this SRS-ResourceSet.

Next, MAC-CE processing time in the second UE processing time will be described in accordance with various embodiments.

In some embodiments, a time duration (Time 4) between a PUCCH with HARQ-ACK information corresponding to a PDSCH and the slot in which the indication carried by the PDSCH is applied. The value of Time 4 is determined according to a first condition. The value of Time 4 is the MAC-CE processing time in the first UE processing time or the MAC-CE processing time in the second UE processing time according to first condition.

In some embodiments, the PDSCH carries at least one of the following: a PDSCH carrying an activation command and indicating mapping between TCI states and codepoints of a DCI field 'Transmission Configuration Indication'; a PDSCH carrying an activation command and indicating semi-persistent reporting setting; a PDSCH carrying a deactivation command and indicating SP CSI-RS/CSI-IM Resource Set deactivation; a PDSCH carrying an activation command for a secondary cell.

In some embodiments, when a UE receives in a PDSCH an activation command for a secondary cell ending in slot n, the UE applies the corresponding actions in no earlier than slot n+k (where n and k are integers), except for the following:
- the actions are related to CSI reporting on a serving cell that is active in slot n+k
- the actions are related to the sCellDeactivationTimer associated with the secondary cell that the UE applies in slot n+k
- the actions are related to CSI reporting on a serving cell which is not active in slot n+k that the UE applies in the earliest slot after n+k in which the serving cell is active.

Note that the value of k is associated with K1 and MAC CE processing time in the UE processing time.

Next, PDCCH decoding time in the second UE processing time is described in accordance with various embodiments.

In some embodiments, if PDCCH decoding time in the second UE processing time is used or a first condition for UE to use a second UE processing time is satisfied or a second UE processing time is used, a first time type will be different from the time when PDCCH decoding in first or third UE processing time is used. The first time includes at least one of the following: a BWP switch delay time, a beam switch time, a beam report time, a slot format indication (SFI) apply time, a channel occupancy (C0) apply time, a time duration for quasi co-location (QCL), search space switch apply time, a cross-slot scheduling application delay time, the minimum time gap, or a power saving offset.

In some embodiments, the first time type when PDCCH decoding time in the second UE processing time or a second UE processing time is used is greater than the first time type when PDCCH decoding time in first or third UE processing time.

In some embodiments, BWP switch delay time (TBWPswitchDelay) is used for DCI-based BWP switch, after the UE receives BWP switching request at DL slot n on a serving cell, UE shall be able to receive PDSCH (for DL active BWP switch) or transmit PUSCH (for UL active BWP switch) on the new BWP on the serving cell on which BWP switches on the first DL or UL slot occurs right after the beginning of DL slot n+TBWPswitchDelay. In some embodiments, BWP switch delay time is the time for switching BWP.

In some embodiments, Beam switch time may be the minimum number of OFDM symbols between the DCI triggering of aperiodic CSI-RS and aperiodic CSI-RS transmission.

In some embodiments, Beam report time may be SFI apply time, which may be a time between DCI which carries an SFI and the slot/symbol in which the indicted SFI applied.

In some embodiments, C0 apply time may be a time between DCI which carries a C0 duration and the slot/symbol in which the indicted C0 duration is applied.

In some embodiments, time duration for QCL may be the minimum number of OFDM symbols required by the UE between PDCCH reception and applying spatial QCL information received in DCI for PDSCH processing.

In some embodiments, search space switch time may be the minimum number of symbols/slots between the PDCCH and the slots in which the indicated search space set is applied.

In some embodiments, cross-slot scheduling application delay time may be a time between a DCI which indicates the minimum scheduling offset change and the slot in which to apply the indicated minimum scheduling offset.

In some embodiments, the minimum time gap may be a time between where the UE is not required to monitor PDCCH for detection of DCI format 2_6 and the slot where the UE would start the drx-onDurationTimer.

In some embodiments, power saving offset may be a time between where the UE starts monitoring PDCCH for detection of DCI format 2_6 according to the number of search space sets and the slot where the drx-onDuarationTimer would start on the primary cell (PCell) or on the special cell (SpCell).

In some embodiments, if PDCCH decoding time in second UE processing time is used or a first condition for UE to use a second UE processing time is satisfied, a first time type ($T\_2$) is determined by the first time type in the first or third UE processing time ($T\_1$) and a factor (B1). B1 may be a positive number and less than 20.

In some embodiments, the first time type is at least one of: a BWP switch delay time, a beam switch time, a beam report time, a time duration for quasi co-location (QCL), search space switch apply time, a cross-slot scheduling application delay time, the minimum time gap, or a power saving offset. For example, $T\_2=T\_1+B1$. In another example, $T\_2=T\_1*B1$. In some embodiments, B1 is associated with at least one of the following: a SCS, a PDCCH decoding time, a repetition time, or a high layer signaling.

In some embodiments, if PDCCH decoding time in the second UE processing time is used or a first condition for UE to use a second UE processing time is satisfied, a specific high layer signaling configures a first time type ($T\_2$) for this case. In some embodiments, the first time type is configured associated with a SCS. In other words, different SCS may be configured with different value of first time type.

Next, cross-carrier scheduling is described in accordance with various embodiments.

In some embodiments, if the PDCCH carrying the scheduling DCI is received on one carrier with one OFDM subcarrier spacing, the PDSCH scheduled to be received by the DCI is on another carrier with another OFDM subcarrier spacing.

If the $\mu PDCCH < \mu PDSCH$, the UE is expected to receive the scheduled PDSCH, if the first symbol in the PDSCH allocation, including the DM-RS, as defined by the slot offset K0 and the start and length indicator SLIV of the scheduling DCI starts no earlier than the first symbol of the PDSCH slot starting at least Npdsch PDCCH symbols after the end of the PDCCH scheduling the PDSCH, not taking into account the effect of receive timing difference between the scheduling cell and the scheduled cell.

If the μPDCCH>μPDSCH, the UE is expected to receive the scheduled PDSCH, if the first symbol in the PDSCH allocation, including the DM-RS, as defined by the slot offset K0 and the start and length indicator SLIV of the scheduling DCI starts no earlier than Npdsch PDCCH symbols after the end of the PDCCH scheduling the PDSCH, not taking into account the effect of receive timing difference between the scheduling cell and the scheduled cell.

In some embodiments, Npdsch associated with a first or third UE processing time is less than the Npdsch associated with the second UE processing time.

In some embodiments, if a first or third UE processing time is used, the Npdsch may be in according to Table 10 below, if a second UE processing time is used, the Npdsch may be according to Table 11 below. In some embodiments, P1>4, P2>5, P3>10, P4>14. In some embodiments, P2>1.5*P1, P3>1.5*P2, P4>1.5*P3.

TABLE 10

$N_{pdsch}$ in the first or third UE processing time

| $\mu_{PDCCH}$ | $N_{pdsch}$ [symbols] |
|---|---|
| 0 | 4 |
| 1 | 5 |
| 2 | 10 |
| 3 | 14 |

TABLE 11

$N_{pdsch}$ in the second UE processing time

| $\mu_{PDCCH}$ | $N_{pdsch}$ [symbols] |
|---|---|
| 0 | P1 |
| 1 | P2 |
| 2 | P3 |
| 3 | P4 |

In summary, as apparent from the foregoing description, embodiments comprise one or more of the following aspects:

In some embodiments, a UE processing time is applied (e.g. for performing, scheduling, or operating transmission (s)) based on a first condition.

In some embodiments, UE processing time may include a first UE processing time, a second UE processing time, and a third UE processing time.

In some embodiments, each UE processing time may include at least one of the following: physical downlink shared channel (PDSCH) processing time N1, physical uplink shared channel (PUSCH) preparation procedure time N2, MAC (Medium Access Control) CE (Control Element) processing time, channel state information (CSI) computation time, or physical downlink control channel (PDCCH) decoding time.

In particular, the second UE processing time allows a more relaxed time than the first UE processing time. Third UE processing time only includes N1 and N2.

In some embodiments, the characteristic of the second UE processing time is at least one of the following: PDSCH processing time N1 in the second UE processing time is larger than or equal to PDSCH processing time N1 in the first UE processing time; PUSCH preparation procedure time N2 in the second UE processing time is larger than or equal to PUSCH preparation procedure time N2 in the first UE processing time; MAC CE processing time in the second UE processing time is larger than or equal to MAC CE processing time in the first UE processing time; CSI computation time in the second UE processing time is larger than or equal to CSI computation time in the first UE processing time; or PDCCH decoding time in the second UE processing time is larger than or equal to PDCCH decoding time in the first UE processing time.

In some embodiments, PDSCH processing time N1 in the second UE processing time may be associated with at least one of the following: PDSCH dedicated demodulation reference signal (DMRS), subcarrier space (SCS), PDSCH mapping type, frequency range (FR) type, a high layer signaling, PDSCH processing time in the first UE processing time, UE capability, UE type (or UE category), or a scaling factor.

In some embodiments, PUSCH preparation procedure time N2 in the second UE processing time may be associated with at least one of the following: SCS, PUSCH preparation procedure time N2 in the first UE processing time, UE capability, UE type (or UE category), a high layer signaling, or FR type.

In some embodiments, the first condition may include at least one of the following: a high layer signaling, a UE capability, a UE type, a DCI, a RNTI, a BWP, a TBS, CORESET, a search space set, or a random access preamble (at least one of the sequence or resource or format).

In some embodiments, for a first UE category (e.g. REDCAP UE), the second kind UE processing time may be applied (or used), e.g. for performing (e.g. operating) transmission(s).

Figure 5:
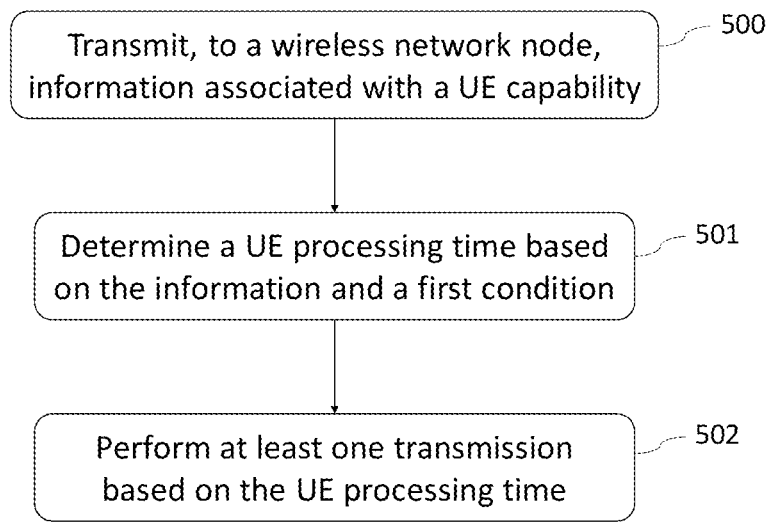
FIG. 5 shows a flowchart of a process according to an embodiment of the present disclosure.

FIG. 5 shows a flowchart of a process according to an embodiment of the present disclosure. The process shown in FIG. 5 may be used in a wireless terminal (e.g. UE) and comprises the following steps:

Step 500: Transmit, to a wireless network node, information associated with a UE capability.

Step 501: Determine a UE processing time based on the information and a first condition.

Step 502: Perform at least one transmission based on the UE processing time.

More specifically, the wireless terminal may transmit (e.g. report) information associated with a UE capability to a wireless network node (e.g. BS or gNB). Based on the reported information and a first condition, the wireless terminal determines UE processing time and performs at least one transmission based on the UE processing time. In this embodiment, the UE processing time comprises one of a first UE processing time, a second UE processing time or a third UE processing time.

The characteristics and/or relationships among the first UE processing time, the second UE processing time and the third UE processing time and/or operations of the wireless terminal can refer to the aforementioned embodiments and are not described herein for brevity.

Figure 6:
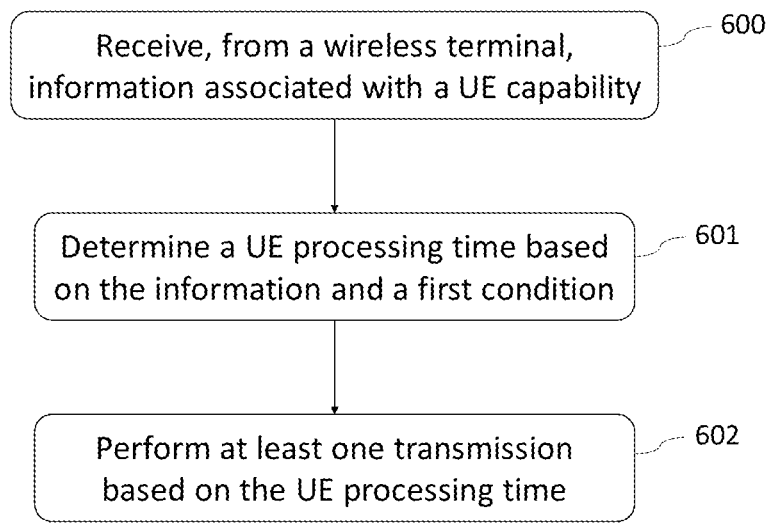
FIG. 6 shows a flowchart of a process according to an embodiment of the present disclosure.

FIG. 6 shows a flowchart of a process according to an embodiment of the present disclosure. The process shown in FIG. 6 may be used in a wireless network node (e.g. BS or gNB) and comprises the following steps:

Step 600: Receive, from a wireless terminal, information associated with a UE capability.

Step 601: Determine a UE processing time based on the information and a first condition.

Step 602: Perform at least one transmission based on the UE processing time.

Specifically, the wireless network may receive information associated with a UE capability from a wireless terminal (e.g. UE). Based on the reported information and a first condition, the wireless network node determines UE processing time and performs at least one transmission based on the UE processing time. Note that, the UE processing time comprises one of a first UE processing time, a second UE processing time or a third UE processing time.

In an embodiment, the wireless network node transmits a high layer signaling indicating one of the first UE processing time, the second UE processing time or the third UE processing time as the UE processing time to the wireless terminal. In another embodiment, the wireless network node transmits a high layer signaling indicating that at least one of the first UE processing time, the second UE processing time or the third UE processing time is enabled/disabled to the wireless terminal.

The features and/or relationships among the first UE processing time, the second UE processing time and the third UE processing time and/or operations of the wireless network node can refer to the aforementioned embodiments and are not recited herein for brevity.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand example features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described example embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method for use in a wireless terminal, the wireless communication method comprising:
transmitting, to a wireless network node, information associated with a user equipment (UE) capability,
determining a UE processing time based on the information and a first condition, and
performing at least one transmission based on the UE processing time,
wherein the UE processing time comprises one of a first UE processing time, a second UE processing time or a third UE processing time,
wherein the first condition of the wireless terminal is associated with a pre-defined UE category and the UE processing refers to the second UE processing time,
wherein the pre-defined UE category comprises a reduced-capability UE, and the UE category is determined by a predefined UE capability, and
wherein if the wireless terminal receives a specific Random Access Response (RAR) message with a Physical Downlink Shared Channel (PDSCH), the second UE processing time is used.

2. The wireless communication method of claim 1,
wherein the second UE processing time is: greater than at least one of the first UE processing time or the third UE processing time,
wherein each UE processing time comprises at least one of: PDSCH processing time, a physical uplink shared channel (PUSCH) preparation procedure time,
wherein the PDSCH processing time corresponding to the second UE processing time is associated with at least one of a PDSCH dedicated demodulation reference signal (DMRS), a subcarrier spacing (SCS), a PDSCH mapping type, a type of frequency range (FR), a high layer signaling, the PDSCH processing time corresponding to the first UE processing time, a user equipment (UE) capability of the wireless terminal, a UE type of the wireless terminal, a UE category of the wireless terminal, or a scaling factor, and
wherein the PDSCH processing time has a positive relationship with the SCS.

3. The wireless communication method of claim 2,
wherein the UE processing time comprises the PDSCH processing time of the second UE processing time,
wherein a first time period associated with the second UE processing time is greater than the first time period associated with the first UE processing time, and
wherein the first time period is associated with the UE processing time and comprises a time duration in a physical random access channel (PRACH) procedure,
wherein, in the PRACH procedure, the time duration is associated with the PDSCH processing time, and
wherein the time duration is associated with at least one of:
time between the last symbol of a PDSCH reception conveying an RAR message with an RAR UL grant and the first symbol of a corresponding PUSCH transmission scheduled by the RAR UL grant;
time between a slot in which a timing advance command received which is for a transmission other than a PUSCH scheduled by an RAR UL grant, or a physical uplink control channel (PUCCH) with hybrid automatic repeat request acknowledge (HARQ-ACK) information in response to a successRAR, and a symbol of corresponding adjustment of the uplink transmission timing applies;
time between the last symbol of a window, or the last symbol of the PDSCH reception and the first symbol to transmit a PRACH if a higher layer indicates the physical layer to transmit a PRACH, wherein, the window is ra-ResponseWindow or msgB-Response Window; or
time between the last symbol of a PDSCH reception with a UE contention resolution identity and the first symbol of the corresponding PUCCH transmission with HARQ-ACK.

4. The wireless communication method of claim 2, wherein the PUSCH preparation procedure time corresponding to the second UE processing time is associated with at least one of a SCS, the PUSCH preparation procedure time corresponding to the first UE processing time, the UE capability of the wireless terminal, a UE type of the wireless terminal, a UE category of the wireless terminal, a high layer signaling, or a type of FR,
wherein the PUSCH processing time corresponding to a first SCS is greater or equal to 1.1 times of the PUSCH processing time corresponding to a second SCS and is smaller than 10 times of the PUSCH processing time corresponding to the second SCS, and the first SCS is greater than the second SCS,
wherein the UE processing time comprises the PUSCH processing time of the second UE processing time,
wherein a second time period associated with the second UE processing time is greater than the second time period associated with the first UE processing time, and wherein the second time period is associated with the UE processing time and comprises at least one of a time period between a physical downlink control channel (PDCCH) and a corresponding PRACH, or a time period between a slot in which a timing advance command is received and an uplink transmission applying the timing advance command.

5. The wireless communication method of claim 2, wherein a medium access control control element (MAC CE) processing time corresponding to the second UE processing time is associated with at least one of a number of slots per subframe, the MAC CE processing time corresponding to the first UE processing, a predefined value, the UE capability or a high layer signaling,
wherein the UE processing time comprises the MAC CE processing time of the second UE processing time,
wherein a third time period associated with the second UE processing time is greater than the third time period associated with the first UE processing time,
wherein the third time period is associated with the UE processing time and is between a PUCCH with HARQ-ACK information corresponding to a PDSCH and a slot in which an indication carried by the PDSCH is applied, and
wherein the indication comprises at least one of: an activation command indicating a mapping between transmission configuration states and codepoints of a field in downlink control information (DCI), the indication comprises an activation command indicating a semi-persistent reporting setting, an activation command for a secondary cell, or the indication comprises a deactivation command indicating at least one of a semi-persistent CSI reference signal resource set deactivation or a CSI interference measurement resource set deactivation.

6. The wireless communication method of claim 2, wherein a channel state information (CSI) computation time corresponding to the second UE processing time is associated with at least one of a report quantity of CSI, the UE capability of the wireless terminal, a high layer signaling, an index of report of CSI, a SCS, a frequency granularity of CSI, or a number of simultaneous CSI calculations supported by the wireless terminal, wherein a physical downlink control channel (PDCCH) decoding time corresponding to the second UE processing time is associated with a SCS, a control resource set (CORESET), a search space set, a DCI format, a radio network temporary identifier (RNTI), the UE capability of the wireless terminal, a UE type of the wireless terminal, a predefined value, a high layer signaling or a UE category of the wireless terminal, wherein the UE processing time comprises the PDCCH decoding time processing time of the second UE processing time, wherein a fourth time period associated with the second UE processing time is greater than the fourth time period associated with the first UE processing time, and wherein the fourth time period associated with the UE processing time comprises at least one of a bandwidth part (BWP), switch delay time, a beam switch time, a beam report time, a slot format indication, (SFI), apply time, a channel occupancy (CO), apply time, a time duration for quasi co-location (QCL), a search space switch apply time, a cross-slot scheduling application delay time, a minimum time gap, or a power saving offset.

7. The wireless communication method of claim 1, wherein the first condition is associated with at least one of a high layer signaling, the UE capability, a UE type, a UE category, DCI, a radio network temporary identifier, a modulation order, a BWP, a transport block size, a CORESET, a search space set, or at least one of a sequence, a resource or a format of a random access preamble, wherein:
the UE capability indicates supporting the second UE processing time, the higher layer signaling indicates enabling the second UE processing time and the UE processing time comprises the second UE processing time, or the first condition is associated with at least one of the DCI scheduling a PDSCH or the modulation order, and the DCI indicates the modulation order is greater than a threshold and the UE processing time comprises the first UE processing time or the third UE processing time, or the DCI indicates the modulation order is smaller than or equal to the threshold and the UE processing time comprises the second UE processing time, or a bandwidth of the BWP is: greater than a threshold and the UE processing time comprises the first UE processing time or the third UE processing time, or is smaller or equal to the threshold and the UE processing time comprises the second UE processing time.

8. The wireless communication method of claim 1, wherein the pre-defined UE capability includes at least type A half-duplex Frequency Division Duplex (FDD) operation.

9. The wireless communication method of claim 1, wherein if the wireless terminal receives the specific RAR message with the PDSCH, the second UE processing time is used, and wherein when the specific RAR message with PDSCH is applicable, transmission of a Physical Uplink Shared Channel (PUSCH) scheduled by a RAR Uplink (UL) grant and PDSCH for contention resolution is included.

10. A wireless communication method for use in a wireless network node, the wireless communication method comprising:

receiving, from a wireless terminal, information associated with a user equipment (UE) capability, determining a UE processing time based on the information and a first condition, and performing at least one transmission based on the UE processing time, wherein the UE processing time comprises one of a first UE processing time, a second UE processing time or a third UE processing time, wherein the first condition of a wireless terminal is associated with a pre-defined UE category and the UE processing refers to the second UE processing time, wherein the pre-defined UE category comprises a reduced-capability UE, and the UE category is determined by a pre-defined UE capability;

wherein if the wireless terminal receives a specific Random Access Response (RAR) message with a Physical Downlink Shared Channel (PDSCH), the second UE processing time is used.

11. The wireless communication method of claim 10, further comprising:

transmitting, to the wireless terminal, a high layer signaling indicating one of the first UE processing time, the second UE processing time or the third UE processing time as the UE processing time, wherein the second UE processing time is: greater than at least one of the first UE processing time or the third UE processing time, wherein the UE processing time comprises at least one of: a PDSCH processing time, a physical uplink shared channel (PUSCH) preparation procedure time, wherein the PDSCH processing time corresponding to the second UE processing time is associated with at least one of a PDSCH dedicated demodulation reference signal (DMRS) a subcarrier spacing (SCS), a PDSCH mapping type, a type of frequency range (FR), a high layer signaling, the PDSCH processing time corresponding to the first UE processing time, the UE capability of the wireless terminal, a UE type of the wireless terminal, a UE category of the wireless terminal, or a scaling factor, wherein the PDSCH processing time has a positive relationship with the SCS.

12. The wireless communication method of claim 11, wherein the UE processing time comprises the PDSCH processing time of the second UE processing time, wherein a first time period associated with the second UE processing time is greater than the first time period associated with the first UE processing time, and wherein the first time period is associated with the UE processing time and comprises a time duration in a physical random access channel (PRACH) procedure, wherein, in the PRACH procedure, the time duration is associated with the PDSCH processing time, and wherein the time duration is associated with at least one of:

time between the last symbol of a PDSCH reception conveying an RAR message with an RAR UL grant and the first symbol of a corresponding PUSCH transmission scheduled by the RAR UL grant;

time between a slot in which a timing advance command received which is for a transmission other than a PUSCH scheduled by an RAR UL grant, or a PUCCH with hybrid automatic repeat request acknowledge (HARQ-ACK) information in response to a successRAR, and a symbol of corresponding adjustment of the uplink transmission timing applies;

time between the last symbol of a window, or the last symbol of the PDSCH reception and the first symbol to transmit a PRACH if a higher layer indicates the physical layer to transmit a PRACH, wherein, the window is ra-ResponseWindow or msgB-ResponseWindow; and time between the last symbol of a PDSCH reception with a UE contention resolution identity and the first symbol of the corresponding PUCCH transmission with HARQ-ACK information.

13. The wireless communication method of claim 11, wherein the PUSCH preparation procedure time corresponding to the second UE processing time is associated with at least one of a SCS, the PUSCH preparation procedure time corresponding to the first UE processing time, the UE capability of the wireless terminal, a UE type of the wireless terminal, a UE category of the wireless terminal, a high layer signaling, or a type of FR,
- wherein the PUSCH processing time corresponding to a first SCS is greater or equal to 1.1 times of the PUSCH processing time corresponding to a second SCS and is smaller than 10 times of the PUSCH processing time corresponding to the second SCS, and wherein the first SCS is greater than the second SCS,
- wherein the UE processing time comprises the PUSCH processing time of the second UE processing time, wherein a second time period associated with the second UE processing time is greater than the second time period associated with the first UE processing time, and wherein second time period is associated with the UE processing time and comprises at least one of a time period between a physical downlink control channel (PDCCH) and a corresponding PRACH, or a time period between a slot in which a timing advance command is received and an uplink transmission applying the timing advance command.

14. The wireless communication method of claim 11, wherein a medium access control control element (MAC CE) processing time corresponding to the second UE processing time is associated with at least one of a number of slots per subframe, the MAC CE processing time corresponding to the first UE processing, a predefined value, a UE capability or a high layer signaling,
- wherein: the UE processing time comprises the MAC CE processing time of the second UE processing time, a third time period associated with the second UE processing time is greater than the third time period associated with the first UE processing time, and the third time period is associated with the UE processing time and is between a physical uplnk control channel (PUCCH) with hybrid automatic repeat request acknowledge (HARQ-ACK) information corresponding to a PDSCH and a slot in which an indication carried by the PDSCH is applied,
- wherein the indication comprises at least one of: an activation command indicating a mapping between transmission configuration states and codepoints of a field in downlink control information (DCI), the indication comprises an activation command indicating a semi-persistent reporting setting, an activation command for a secondary cell, or the indication comprises a deactivation command indicating at least one of a semi-persistent CSI reference signal resource set deactivation or a CSI interference measurement resource set deactivation,
- wherein the CSI computation time corresponding to the second UE processing time is associated with at least one of a report quantity of CSI, the UE capability of the wireless terminal, a high layer signaling, an index of report of CSI, a SCS, a frequency granularity of CSI, or a number of simultaneous CSI calculations supported by the wireless terminal.

15. The wireless communication method of claim 11, wherein a physical downlink control channel ( PDCCH) decoding time corresponding to the second UE processing time is associated with a SCS, a control resource set (CORESET), a search space set, a DCI format, a radio network temporary identifier (RNTI), the UE capability of the wireless terminal, a UE type of the wireless terminal, a predefined value, a high layer signaling or a UE category of the wireless terminal,
- wherein the UE processing time comprises the PDCCH decoding time processing time of the second UE processing time, wherein a fourth time period associated with the second UE processing time is greater than the fourth time period associated with the first UE processing time, and wherein the fourth time period is associated with the UE processing time comprises at least one of a bandwidth part (BWP), switch delay time, a beam switch time, a beam report time, a slot format indication (SFI), apply time, a channel occupancy (CO), apply time, a time duration for quasi co-location (QCL), a search space switch apply time, a cross-slot scheduling application delay time, a minimum time gap, or a power saving offset.

16. The wireless communication method of claim 10,
- wherein the first condition is associated with at least one of: a high layer signaling, the UE capability, a UE type, a UE category, DCI, a radio network temporary identifier, a modulation order, a BWP, a transport block size, a CORESET, a search space set, or at least one of a sequence, a resource or a format of a random access preamble,
- wherein:
  - the UE capability indicates supporting the second UE processing time, the higher layer signaling indicates enabling the second UE processing time and the UE processing time comprises the second UE processing time, or
  - the first condition is associated with at least one of the DCI scheduling a PDSCH or the modulation order, and the DCI indicates the modulation order is: greater than a threshold and the UE processing time comprises the first UE processing time or the third UE processing time, or smaller than or equal to the threshold and the UE processing time comprises the second UE processing time, or
  - a bandwidth of the BWP is: greater than a threshold and the UE processing time comprises the first UE processing time or the third UE processing time, or smaller or equal to the threshold and the UE processing time comprises the second UE processing time.

17. The wireless communication method of claim 10, wherein the pre-defined UE capability includes at least type A half-duplex Frequency Division Duplex (FDD) operation.

18. The wireless communication method of claim 10, wherein if the wireless terminal receives the specific RAR message with the PDSCH, the second UE processing time is used, and
- wherein when the specific RAR message with PDSCH is applicable, transmission of a Physical Uplink Shared Channel (PUSCH) scheduled by a RAR Uplink (UL) grant and PDSCH for contention resolution is included.

19. A wireless terminal, comprising:
- a communication unit, configured to transmit, to a wireless network node, information associated with a user equipment (UE) capability, and
- a processor configured to:
- determine a UE processing time based on the information and a first condition, and
- perform at least one transmission based on the UE processing time,
- wherein the UE processing time comprises one of a first UE processing time, a second UE processing time or a third UE processing time,
- wherein the first condition of the wireless terminal is associated with a pre-defined UE category and the UE processing refers to the second UE processing time, wherein the pre-defined UE category comprises a reduced-capability UE, and the UE category is determined by a pre-defined UE capability;

wherein if the wireless terminal receives a specific Random Access Response (RAR) message with a Physical Downlink Shared Channel (PDSCH), the second UE processing time is used.

20. The wireless terminal of claim 19, wherein the pre-defined UE capability includes at least type A half-duplex Frequency Division Duplex (FDD) operation.

* * * * *